(12) United States Patent
Lee et al.

(10) Patent No.: US 10,767,837 B2
(45) Date of Patent: Sep. 8, 2020

(54) OPTICAL MEMBER AND LIGHTING DEVICE USING THE SAME

(71) Applicant: LG INNOTEK CO., LTD., Seoul (KR)

(72) Inventors: Dong Hyun Lee, Seoul (KR); Jin Su Kim, Seoul (KR); Seung Jong Baek, Seoul (KR); Jae Hyuk Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 56 days.

(21) Appl. No.: 15/868,327

(22) Filed: Jan. 11, 2018

(65) Prior Publication Data

US 2018/0142865 A1  May 24, 2018

Related U.S. Application Data

(63) Continuation of application No. 14/541,954, filed on Nov. 14, 2014, now Pat. No. 9,897,282.

(30) Foreign Application Priority Data

Nov. 15, 2013 (KR) .......................... 10-2013-0139373

(51) Int. Cl.
*F21V 7/04* (2006.01)
*F21V 7/00* (2006.01)
(Continued)

(52) U.S. Cl.
CPC ................ *F21V 7/048* (2013.01); *F21K 9/60* (2016.08); *F21S 41/14* (2018.01); *F21S 41/141* (2018.01);
(Continued)

(58) Field of Classification Search
CPC ........ F21V 7/048; F21V 13/04; F21V 7/0008; F21S 41/141; F21S 41/20; F21S 41/14;
(Continued)

(56) References Cited

U.S. PATENT DOCUMENTS

| 4,799,135 A | 1/1989 | Inukai et al. |
| 5,117,335 A | 5/1992 | Yamada |

(Continued)

FOREIGN PATENT DOCUMENTS

| JP | 2009-259708 A | 11/2009 | |
| JP | 4926905 B2 * | 5/2012 | ........... G02B 6/0085 |

(Continued)

OTHER PUBLICATIONS

Office Action dated Sep. 20, 2019 in Korean Application No. 10-2013-0139373.

*Primary Examiner* — Isiaka O Akanbi
*Assistant Examiner* — Glenn D Zimmerman
(74) *Attorney, Agent, or Firm* — Saliwanchik, Lloyd & Eisenschenk

(57) ABSTRACT

Provided are an optical member capable of implementing optical images having a desired shape and a lighting device using the optical member. The optical member can include a base substrate and a plurality of unit patterns sequentially arranged on a first surface of the base substrate and each having an inclined surface with respect to the first surface. Each unit pattern can be extended in a pattern extension direction, respectively. The plurality of unit patterns and the inclined surfaces thereof can be structurally arranged on the first surface of the base substrate such that any beam of incident light that strikes a unit pattern at a right angle to the pattern extension direction in which said unit pattern extends is guided away from the optical member.

20 Claims, 11 Drawing Sheets

(51) Int. Cl.
   *F21V 13/04* (2006.01)
   *F21K 9/60* (2016.01)
   *F21S 43/14* (2018.01)
   *F21S 43/20* (2018.01)
   *F21S 41/14* (2018.01)
   *F21S 41/20* (2018.01)
   *F21S 41/141* (2018.01)
   *F21Y 115/10* (2016.01)
   *B60Q 3/64* (2017.01)

(52) U.S. Cl.
   CPC .............. *F21S 41/20* (2018.01); *F21S 43/14* (2018.01); *F21S 43/26* (2018.01); *F21V 7/0008* (2013.01); *F21V 13/04* (2013.01); *B60Q 3/64* (2017.02); *F21Y 2115/10* (2016.08)

(58) Field of Classification Search
   CPC .. F21S 43/26; F21S 43/14; F21K 9/60; F21Y 2115/10; B60Q 3/64
   See application file for complete search history.

(56) References Cited

U.S. PATENT DOCUMENTS

| | | | |
|---|---|---|---|
| 5,629,784 A * | 5/1997 | Abileah | G02F 1/133504 349/112 |
| 6,000,814 A | 12/1999 | Nestell et al. | |
| 6,633,722 B1 | 10/2003 | Kohara et al. | |
| 6,993,244 B2 | 1/2006 | Kuo | |
| 7,106,517 B2 | 9/2006 | Olczak | |
| 8,998,445 B2 * | 4/2015 | Lee | G02B 6/0035 362/231 |
| 2002/0080598 A1 | 6/2002 | Parker et al. | |
| 2004/0085750 A1 | 5/2004 | Okuwaki et al. | |
| 2004/0227262 A1 | 11/2004 | Kim | |
| 2006/0039670 A1 | 2/2006 | Feng et al. | |
| 2006/0104092 A1 | 5/2006 | Feng et al. | |
| 2008/0068836 A1 * | 3/2008 | Hatanaka | G02B 6/0028 362/231 |
| 2009/0316057 A1 | 12/2009 | Campbell et al. | |
| 2010/0027294 A1 * | 2/2010 | Lee | G02B 5/02 362/620 |
| 2010/0073955 A1 | 3/2010 | Cornelissen et al. | |
| 2011/0038137 A1 | 2/2011 | Ishikawa et al. | |
| 2011/0096570 A1 | 4/2011 | Vissenberg et al. | |
| 2011/0164434 A1 * | 7/2011 | Derichs | G02B 6/0011 362/612 |
| 2011/0261582 A1 | 10/2011 | Cornelissen et al. | |
| 2013/0107572 A1 | 5/2013 | Holman et al. | |
| 2013/0329432 A1 | 12/2013 | Parker et al. | |
| 2014/0043856 A1 * | 2/2014 | Thompson | F21V 3/049 362/613 |
| 2014/0146569 A1 | 5/2014 | Miyake et al. | |
| 2015/0043241 A1 * | 2/2015 | Deshazer | G02B 1/045 362/558 |

FOREIGN PATENT DOCUMENTS

| | | | | |
|---|---|---|---|---|
| JP | 2013-165072 A | 8/2013 | | |
| KR | 10-0855248 B1 | 8/2008 | | |
| WO | WO-2005/119351 A1 | 12/2005 | | |
| WO | WO-2009/099547 A2 | 8/2009 | | |
| WO | WO-2011125827 A1 * | 10/2011 | ......... | G03F 7/70075 |
| WO | WO-2012/147996 A1 | 11/2012 | | |

* cited by examiner

OPTICAL MEMBER AND LIGHTING DEVICE USING THE SAME

CROSS-REFERENCE TO RELATED APPLICATIONS

This application is a continuation of U.S. application Ser. No. 14/541,954, filed Nov. 14, 2014, which claims the benefit under 35 U.S.C. § 119 of Korean Patent Application No. 10-2013-0139373, filed on Nov. 15, 2013, which is hereby incorporated by reference in its entirety.

BACKGROUND

Description of the Related Arts

In general, a lighting device is a device used for illuminating a dark place using various light sources. The lighting device is used to shine a beam at a specific object or space and to express an atmosphere of the specific object or space in a desired shape or color.

According to the technical development of an LED (Light Emitting Diode), lighting devices in various shapes using LEDs have recently come into wide use. For example, one of the lighting devices according to a conventional art includes a diffusion plate for emitting light emitted from LED light sources to the outside.

Most of the LED lighting devices according to the conventional art are configured so that light is uniformly outputted on an entire light emitting surface. Also, in order to express the atmosphere of a specific object or space in a desired shape or color, a color filter or a filter having a light permeable hole in a desired shape has been used in some lighting devices according to the conventional art.

However, when the atmosphere of a specific object or space is expressed in a desired shape or color using the LED lighting devices according to the conventional art, the configuration of the devices becomes mechanically complicated, and as a result, it is problematic in that the degree of freedom in design is limited, and it is difficult to install or maintain and manage the devices.

BRIEF SUMMARY

Embodiments of the present invention relate to an optical member capable of implementing optical images having a desired shape through a pattern design, and a lighting device using the optical member.

In order to address the disadvantages discussed above and to express the atmosphere in a desired shape or color of an optical image, embodiments include a light device having a simple structure, which is easy to install or maintain and manage.

An aspect of embodiments of the present invention may provide an optical member which can be used in implementing optical images having a desired shape or surface illumination in design by controlling an optical path, an optical width, and luminous intensity.

Another aspect of embodiments of the present invention may provide a lighting device capable of implementing an optical image having various designs in various lighting fields, such as general lighting, design lighting, vehicle (e.g., a car or a bus) lighting and the like by utilizing the optical member.

In an embodiment, an optical member can include: a base substrate; and a plurality of unit patterns sequentially arranged on a first surface of the base substrate and each having an inclined surface with an inclination angle with respect to a unit pattern inclination angle direction of the first surface, respectively. Each unit pattern inclination angle direction is parallel to the first surface, each unit pattern is extended in a pattern extension direction, respectively, and each pattern extension direction is parallel to the first surface and is perpendicular to the respective unit pattern inclination angle direction of the unit pattern which is extended in said pattern extension direction. The plurality of unit patterns and the inclined surfaces thereof are structurally arranged on the first surface of the base substrate such that any beam of incident light that strikes a unit pattern at a right angle to the pattern extension direction in which said unit pattern extends is guided away from the optical member. In a particular embodiment, at least two of the pattern extension directions are non-parallel to each other.

The pattern extension directions of the plurality of unit patterns can cross each other, such that a distance between adjacent unit patterns is smaller near a first edge of the base substrate than it is near a second edge of the base substrate opposite to the first side.

Each inclined surface can be a mirror-like finishing surface. A roughness of each inclined surface can be 0.02 or less in arithmetical average roughness (Ra) and 0.30 or less in maximum height roughness (Ry). The inclination angle of each inclined surface can be in a range of from 5° to 85°. A refractive index of the base substrate can be in a range of from 1.3 to 1.8, and the inclination angle of each inclined surface can be in a range of from 33.7° to 50.3°.

A refractive index of the base substrate can be in a range of from 1.3 to 1.8, and the inclination angle of each inclined surface can be in a range of from 49.7° to 56.3°.

A cross section of each inclined surface can have a straight-line shape, a rounded shape, a shape having a plurality of straight-line segments connected to form an overall curved shape, or a combination thereof.

A distance between two adjacent unit patterns among the plurality of unit patterns can range from 10 to 500 μm.

Each unit pattern can have two inclined surfaces, each with an inclination angle with respect to the unit pattern inclination angle direction, and a cross-sectional view of each unit pattern can have a triangular shape, with the first surface of the base and the two inclined surfaces being the three sides of the triangle. In a particular embodiment, in the cross-sectional view of each unit pattern, the inclined surfaces can have different lengths.

The base substrate can be a transparent substrate having a haze of 2% or less in a plate or film form. A thickness of the base substrate can be in a range of from 25 μm to 250 μm. Alternatively, a thickness of the base substrate can be in a range of from 250 μm to 10 mm.

The base substrate can include a photocurable polymer, a thermosetting polymer, or a thermoplastic polymer. The base substrate can include polycarbonate, polymethylmethacrylate, polystyrene, polyethylene terephthalate, or glass.

The plurality of unit patterns can be formed of the same material as the first surface of the base substrate.

The plurality of unit patterns can be provided as a pattern layer bonded to the first surface of the base substrate. The pattern layer can include a photocurable resin.

In another embodiment, a lighting device can include an optical member as discussed herein; and a light source unit irradiating light to the optical member.

The light source unit can be structurally arranged such that an artificial three-dimensional effect is generated whereby at least a portion of light reflected from the plurality of unit patterns appears to a viewer to originate from a depth below the optical member.

The plurality of unit patterns can serve as dummy light sources in which optical paths become longer in order as a distance from the light source is increased, thereby generating the artificial three-dimensional effect.

In an embodiment, a vehicle can include a lighting device as described herein. The vehicle can also include a vehicle body. The vehicle can be a bus. Each unit pattern can have two inclined surfaces, each with an inclination angle with respect to the unit pattern inclination angle direction. A cross-sectional view of each unit pattern can have a triangular shape, with the first surface of the base and the two inclined surfaces being the three sides of the triangle, and wherein, in the cross-sectional view of each unit pattern, the inclined surfaces can have different lengths.

In yet another embodiment, a lighting device can include: an optical member; and a light source unit irradiating light to the optical member, wherein the optical member comprises: a base substrate; and a plurality of unit patterns sequentially arranged on a first surface of the base substrate and each having an inclined surface with an inclination angle with respect to a unit pattern inclination angle direction of the first surface. Each unit pattern inclination angle direction can be parallel to the first surface, each unit pattern can extended in a pattern extension direction, respectively, and each pattern extension direction can be parallel to the first surface and is perpendicular to the respective unit pattern inclination angle direction of the unit pattern which is extended in said pattern extension direction. The plurality of unit patterns and the inclined surfaces thereof can be structurally arranged on the first surface of the base substrate such that any beam of incident light that strikes a unit pattern at a right angle to the pattern extension direction in which said unit pattern extends is guided away from the optical member. The light source unit can be structurally arranged such that an artificial three-dimensional effect is generated whereby at least a portion of light reflected from the plurality of unit patterns appears to a viewer to originate from a depth below the optical member.

The light source unit can include a first light source and a second light source, wherein the first light source irradiates light in the same direction as the second light source irradiates light or in a direction which crosses the direction in which the second light source irradiates light.

The light source unit can include a first light source and a second light source, wherein the first light source irradiates light in a first direction, wherein the second light source irradiates light in a second direction, and wherein the first direction and the second direction are opposed to each other at an angle with each other in a range of from 90° to 180°.

The light source unit can includes LED (light emitting diode) elements as light sources.

The lighting device can further include a support member or a housing, wherein the support member or the housing is configured to support at least one of the optical member and the light source unit.

Each unit pattern can have two inclined surfaces, each with an inclination angle with respect to the unit pattern inclination angle direction, wherein a cross-sectional view of each unit pattern has a triangular shape, with the first surface of the base and the two inclined surfaces being the three sides of the triangle. In the cross-sectional view of each unit pattern, the inclined surfaces can have different lengths.

The lighting device can further include an outer lens which is configured such that one surface on which the optical member is disposed has a curvature.

In an embodiment, a vehicle can include a vehicle body and a lighting device as described herein, wherein the outer lens is mounted to the vehicle body. The vehicle can further include a vehicle battery, wherein the light source unit is connected to the vehicle battery and receives power from the car vehicle battery. The vehicle can be, e.g., a car or a bus. At least two of the pattern extension directions can be non-parallel to each other. In a particular embodiment, each unit pattern can have two inclined surfaces, each with an inclination angle with respect to the unit pattern inclination angle direction, wherein a cross-sectional view of each unit pattern has a triangular shape, with the first surface of the base and the two inclined surfaces being the three sides of the triangle, and wherein, in the cross-sectional view of each unit pattern, the inclined surfaces have different lengths.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Figure 1:
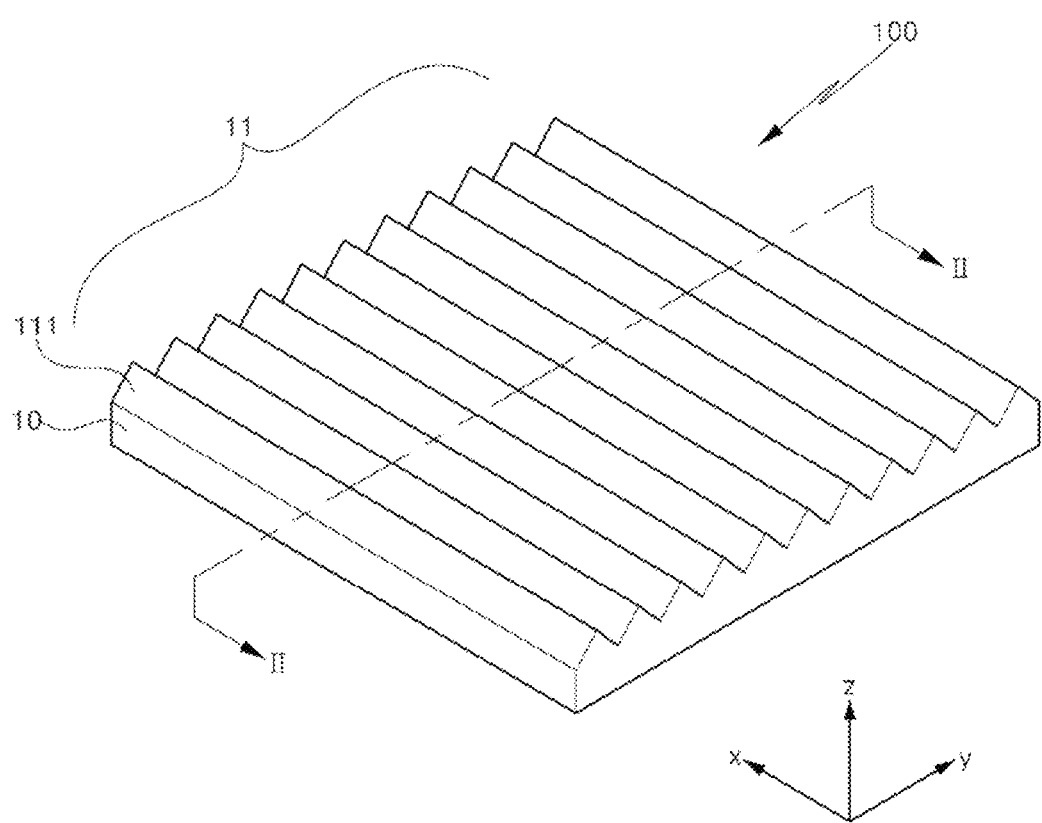
FIG. 1 is a perspective view for an optical member according to an embodiment of the present invention.

Hereinafter, the embodiments of the present invention that an ordinary person skilled in the art can implement will be described with reference to the accompanying drawings. The embodiments in the specification and the constructions shown in the drawings are provided as a preferred embodiment of the present invention, and it should be understood that there may be various equivalents and modifications which could substitute at the time of filing. In addition, when it comes to the operation principle of the preferred embodiments of the present invention, description of certain known functions may be omitted. The terms below are defined in consideration of the functions of the present invention, and the meaning of each term should be interpreted by judging the whole parts of the present specification, and the elements having the similar functions and operations of the drawings are given the same reference numerals.

In an embodiment, an optical member can include: a base substrate; and a plurality of unit patterns sequentially arranged on a first surface of the base substrate and each having an inclined surface with an inclination angle with respect to a unit pattern inclination angle direction of the first surface, respectively, wherein each unit pattern inclination angle direction is parallel to the first surface, wherein each unit pattern is extended in a pattern extension direction, respectively, and wherein each pattern extension direction is parallel to the first surface and is perpendicular to the respective unit pattern inclination angle direction of the unit pattern which is extended in said pattern extension direction. The plurality of unit patterns and the inclined surfaces thereof can be structurally arranged on the first surface of the base substrate such that any beam of incident light that strikes a unit pattern at a right angle to the pattern extension direction in which said unit pattern extends is guided away from the optical member. In certain embodiments, at least two of the pattern extension directions are non-parallel to each other. For example, all of the pattern extension directions can be non-parallel to each other. In an alternative embodiment, all of the pattern extension directions are parallel to each other. In a particular embodiment, some, but not all, of the pattern extension directions are parallel to each other.

Figure 2:
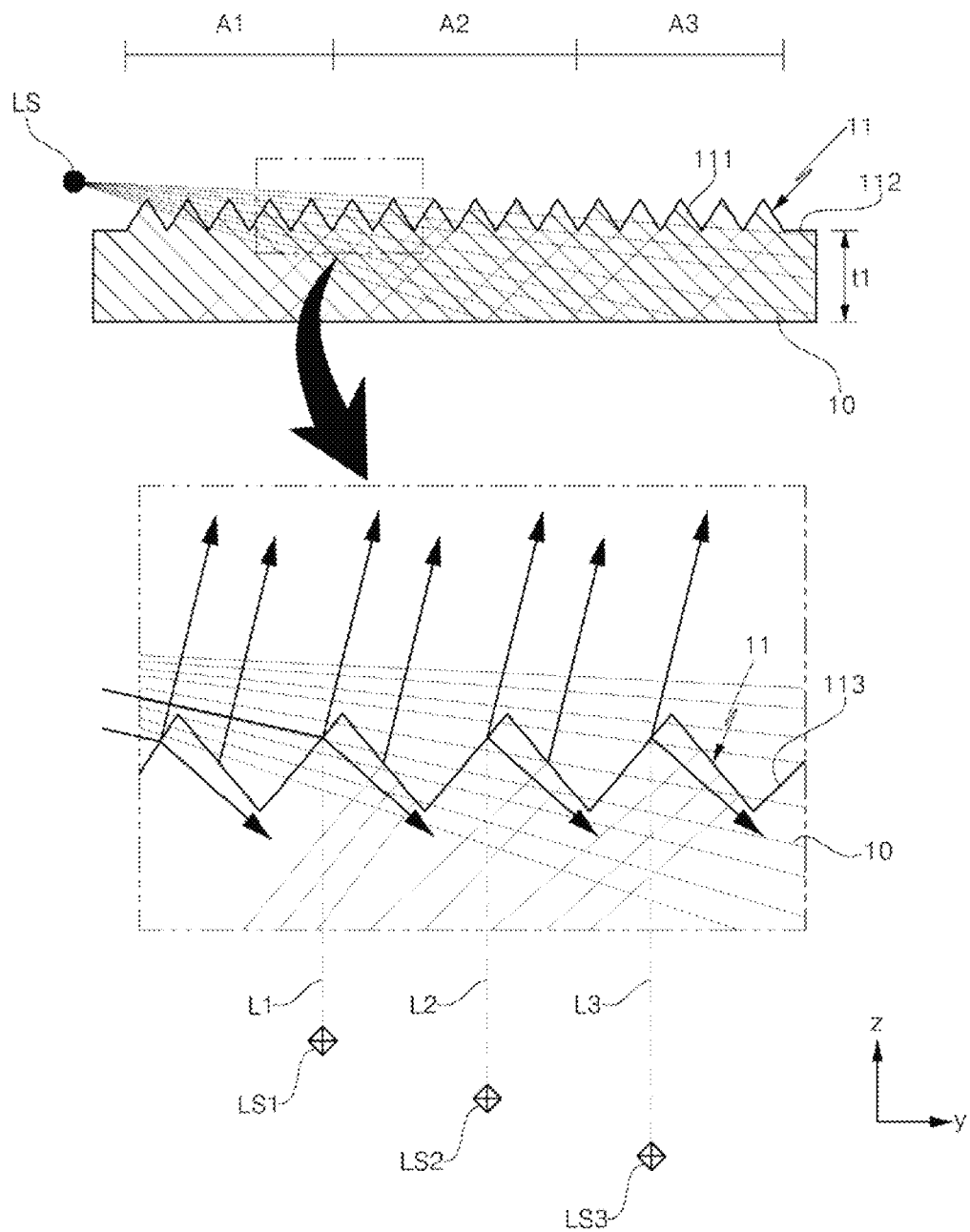
FIG. 2 is a cross-sectional view for the optical member of FIG. 1 and a partial exploded view thereof.

FIG. 1 is a perspective view for an optical member according to an embodiment of the present invention. FIG. 2 is a cross-sectional view for the optical member of FIG. 1 and a partial exploded view thereof.

Referring to FIGS. 1 and 2, an optical member 100 according to the present embodiment includes a base substrate 10 and a pattern 11. The pattern 11 includes a plurality of unit patterns sequentially arranged on a first surface of the base substrate 10, and each of the unit patterns 111 has an inclined surface 113 with an inclination angle with respect to a unit pattern inclination angle direction of the first surface, respectively.

The base substrate 10 can be a transparent substrate. The base substrate 10 may be formed of a material having a haze of 20 or less in consideration of light efficiency. Also, it is preferable that a light transmittance of the base substrate 10 be 90% or more, though embodiments are not limited thereto. For example, the light transmittance of the base substrate 10 may be selected from a range of about 60% or more according to a desired shape when implementing optical images of line-shaped beams, three-dimensional beams or line-shaped beams with a three-dimensional effect. When the light transmittance of the base substrate 10 is less than 60%, it is difficult to implement the line-shaped beam or the 3D beam, or light efficiency can be largely reduced.

The base substrate 10 can have a first surface and a second surface opposed to the first surface. When the base substrate 10 is provided in a plate or film, an area of each of the first surface and the second surface can be relatively large compared to other surfaces of the base substrate 10, and the first and second surfaces can become two surfaces that are approximately parallel to each other. The first surface may be called a first main surface or a pattern arrangement surface 112.

The base substrate 10 can be made of a polymeric material. The material of the base substrate 10 may be, for example, a photocurable polymer, a thermosetting polymer or a thermoplastic polymer. Also, the material of the base substrate 10 may be polycarbonate (PC), polymethylmethacrylate (PMMA), polystyrene (PS), polyethylene terephthalate (PET) or glass.

The first surface of the base substrate 10 can be an upper or top surface on which unit patterns can be arranged. Each unit pattern can have an inclination angle with respect to a unit pattern inclination angle direction (e.g., the y-direction as depicted in FIG. 1) of the first surface, respectively, and each unit pattern inclination angle direction can be parallel to the first surface. Each unit pattern can be extended in a pattern extension direction (e.g., the x-direction as depicted in FIG. 1), respectively, wherein each pattern extension direction is parallel to the first surface and is perpendicular to the respective unit pattern inclination angle direction of the unit pattern which is extended in said pattern extension direction.

The plurality of unit patterns and the inclined surfaces thereof are structurally arranged on the first surface of the base substrate such that any beam of incident light that strikes a unit pattern at a right angle to the pattern extension direction in which said unit pattern extends is guided away from the optical member.

A light device can include an optical member of the subject invention and a light source unit irradiating light to the optical member. The light source can be structurally arranged such that an artificial three-dimensional effect is generated whereby at least a portion of light reflected from the plurality of unit patterns appears to a viewer to originate from a depth below the optical member. For example, the artificial three-dimensional effect makes it appear to a viewer above the optical member and looking down on the optical member toward the first surface of the base substrate (and with a line of sight that is perpendicular to or approximately perpendicular to the first surface, such as the z-direction as depicted in FIG. 1) that at least a portion of light reflected from the plurality of unit patterns originates from a depth below the optical member. This artificial three-dimensional effect can be seen in, for example, FIG. 15.

In an embodiment, an optical member can unit patterns such that each unit pattern has two inclined surfaces, each with an inclination angle with respect to the unit pattern inclination angle direction, wherein a cross-sectional view of each unit pattern has a triangular shape, with the first surface of the base and the two inclined surfaces being the three sides of the triangle, and wherein, in the cross-sectional view of each unit pattern, the inclined surfaces have different lengths. For example, the unit patterns may have triangular cross-sections (taken in a direction perpendicular to the first surface of the base substrate and parallel to an angle inclination direction of each unit pattern, respectively) that are not equilateral or isosceles triangles.

A refractive index of the base substrate 10 may range from about 1.30 to about 1.80. Also, according to some embodiments, the refractive index of the base substrate 10 may range from about 1.80 to about 2.50. In this case, an inclined surface 113 of each of multiple unit patterns 111 may be provided so as to have a predetermined inclination angle according to the refractive index of the base substrate 10. The inclination angle may be an angle formed between the pattern arrangement surface 112 of the base substrate 10 and the inclined surface 113 or an angle formed between a straight line which crosses right angles to the pattern arrangement surface, and the inclined surface 113.

In an embodiment, the plurality of unit patterns 111 can implement a line-shaped beam of a first path which crosses right angles to a pattern extension direction (an x-direction) of the plurality of unit patterns by guiding first incident beams in a first surface direction to which the first surface faces or a second surface direction to which the second surface faces according to refraction and reflection generated from the inclined surface 113 of each of the unit patterns.

The inclined surface 113 can be provided so as to substantially limit diffused reflection of the incident beams and enable light returned to an incidence angle to hardly exist. That is, the inclined surface 113 can be provided so as to substantially guide the incident beams in a predetermined direction according to refraction and regular reflection of the incident beams.

The aforesaid line-shaped beams may refer to light guided and concentrated so as to form an illuminating portion (e.g., a line-shaped illuminating portion) that has a predetermined width (e.g., an optical width) and a longer length than the optical width and is brighter (e.g., dozens of times brighter or more) compared to peripheral areas with regard to the light irradiated to a hemisphere area (an optical effective area) of a pattern 11. The guiding and concentrating of the light are intended to enable the light of a predetermined optical path (the first path) according to the position of a reference point or an observing position within the optical effective area to be relatively clearly seen compared to light of the peripheral areas. A longitudinal direction of the line-shaped beams may be parallel to a y direction. That is, in an embodiment, the first path may refer to an optical path of light moving in the y direction as depicted in FIG. 1.

Also, the aforesaid first surface direction and the second surface direction can refer to at least two directions which are opposed to each other at a thickness direction (e.g., the z-direction as depicted in FIG. 1) of the base substrate 10 with the base substrate 10 as the center. That is, the first surface direction can include various directions to which the first surface faces, and the second surface direction can include various directions to which the second surface faces.

Also, the aforesaid pattern extension direction can be a direction in which a specific straight line on the inclined surface extends or a direction in which a specific tangent line coming into contact with a curved line of the inclined surface extends. In order to enable an optical path with respect to emission light of light sources illuminating light to the plurality of unit patterns 111 to be limited to a desired direction, e.g., the first path, the pattern extension direction can be provided so that the inclined surface of each of the unit pattern surfaces is parallel or approximately parallel to the pattern arrangement surface and extends in a direction crossing at right angles to the first path.

Referring to FIG. 2, the plurality of unit patterns 111 can serve as indirect light sources whose light paths become gradually longer in order as a distance from the light sources is increased, and thus generates a three-dimensional effect beam (i.e., an artificial three-dimensional effect having a perceptional depth at the thickness direction (a z direction) of the base substrate 10. That is, light reflected (e.g., at least a portion of the light reflected) from the optical member can appear to a viewer (e.g., a viewer looking down on the base substrate in the z-direction) to originate from a depth below the optical member. The thickness direction of the base substrate 10 may be a direction which crosses at right angles to the pattern extension direction (the x direction) and the first direction (the y direction).

In other words, when the plurality of unit patterns 111 include a first unit pattern, a second unit pattern and a third unit pattern which are sequentially arranged in a first pattern area A1, a second pattern area A2 and a third pattern area A3 according to a distance from the light source LS, a second optical path of the second unit pattern can be longer than a first optical path of the first unit pattern and can be smaller than a third optical path of the third unit pattern. That is, a second distance L2 between a second dummy light source LS2 of the light source LS resulting from an inclined surface of a second unit pattern and the inclined surface of the second unit pattern can be longer than a first distance L1 between a first dummy light source LS1 of the light source LS resulting from an inclined surface of a first unit pattern and the inclined surface of the first unit pattern, and can be shorter than a third distance L3 between a third dummy light source LS3 of the light source LS resulting from an inclined surface of a third unit pattern and the inclined surface of the third unit pattern. Such a configuration can implement line shaped beams with a three-dimensional (3D) effect showing a shape in which the plurality of unit patterns 111 have long optical paths as a distance from the light source LS in a longitudinal direction of the line shaped beams is increased, and accordingly, when viewed from a virtual point (a reference point or an observing point) in a direction being appropriately vertical to the pattern arrangement surface 112 (e.g., above the pattern arrangement surface in the z-direction), the light source can appear far away from the plurality of unit patterns as the optical paths become longer.

The second unit pattern may be a unit pattern which comes right after the first unit pattern on the pattern arrangement surface 112 as viewed from the light sources (LS) or a unit pattern positioned between the first unit pattern and other unit patterns in a predetermined number. Similarly, the third unit pattern may be a unit pattern positioned just after the second unit pattern on the pattern arrangement surface 112 as viewed from the light source LS, or a unit pattern positioned between the second unit pattern and other unit patterns in a predetermined number.

Also, a three-dimensional effect beam refers to an optical image having a shape (a perceptional depth) in which a line-shaped beam concentrated to a predetermined optical path (a first path) by a pattern design gradually enters the base substrate 10 from the first surface of the base substrate 10 toward the second surface of the base substrate 10 as viewed from the first surface direction or the second surface direction. Furthermore, the three-dimensional effect beam is another name for a specific optical image of the line-shaped beam as an embodiment of the line-shaped beam implemented in the present invention.

According to some embodiments, the plurality of unit patterns can be provided by removing a part of the first surface of the base substrate 10, though embodiments are not limited thereto. That is, according to some embodiments, the plurality of unit patterns 111 may be provided on a separate layer bonded to the first surface of the base substrate 10.

Figure 3:
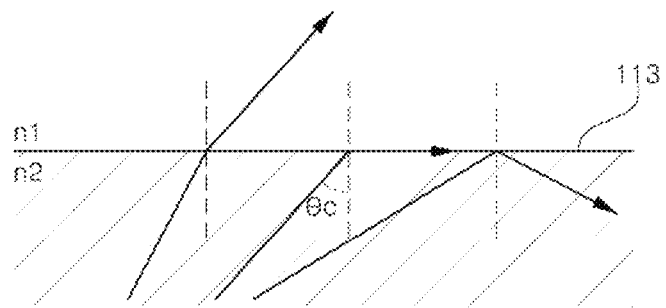
FIG. 3 is a view illustrated to explain the principles of refraction and reflection of the optical member of FIG. 1.

FIG. 3 is a view illustrated to explain the principles of refraction and reflection of the optical member of FIG. 1.

Referring to FIG. 3, with respect to the plurality of unit patterns of the optical member according to the present embodiment, the inclined surface 113 of the respective unit patterns can refract and/or reflect incident beams according to an incidence angle θc.

That is, when a refractive index of air is n1, and a refractive index of the base substrate is n2, light, which travels from the inside of the base substrate to the air of the outside, is refracted and/or reflected from a boundary surface thereof, e.g., the inclined surface 113 of each of the unit patterns, according to the incidence angle of the light. Similarly, light, which travels from the air of the outside of the base substrate to the inside of the base substrate, can also be refracted and/or reflected from the inclined surface 113 of the unit patterns according to the incidence angle of the light.

The inclined surface 113 of the unit patterns can be provided so as to have a predetermined surface roughness in order to implement an optical image having a desired shape through a pattern design. That is, when using the plurality of unit patterns having the inclined surface 113 with a predetermined surface roughness and guiding incident beams (e.g. away from the base substrate such as to the first surface direction or the second surface direction) by refracting and/or reflecting the incident beams, optical paths, optical widths and light intensity of the incident beams may be controlled. Accordingly, line shaped beams, three-dimensional effect beams or line shaped beams with a 3D effect having desired shapes may be implemented.

According to certain embodiments, the inclined surface 113 can be a mirror-like finishing surface. The inclined surface 113 may be a precision machining surface. In other words, a surface roughness of the inclined surface 113 may be 0.02 or less in average roughness of a center line or in arithmetical average roughness Ra and may be 0.3 or less in maximum height roughness Ry even through there is a difference according to processing methods. According to some embodiments, the surface roughness of the inclined surface 113 may be 0.8 or less in ten point median height Rz. Here, a reference length may be 0.25 mm.

The aforesaid configuration of the inclined surface 113 is intended to secure a refractive index of the inclined surface beyond a certain value, and when the surface roughness is rougher than the values as described above, it is difficult to properly implement the line shaped beams due to the scattering of light or light exceeding a certain amount retuned from the inclined surface to the light source.

Figure 4:
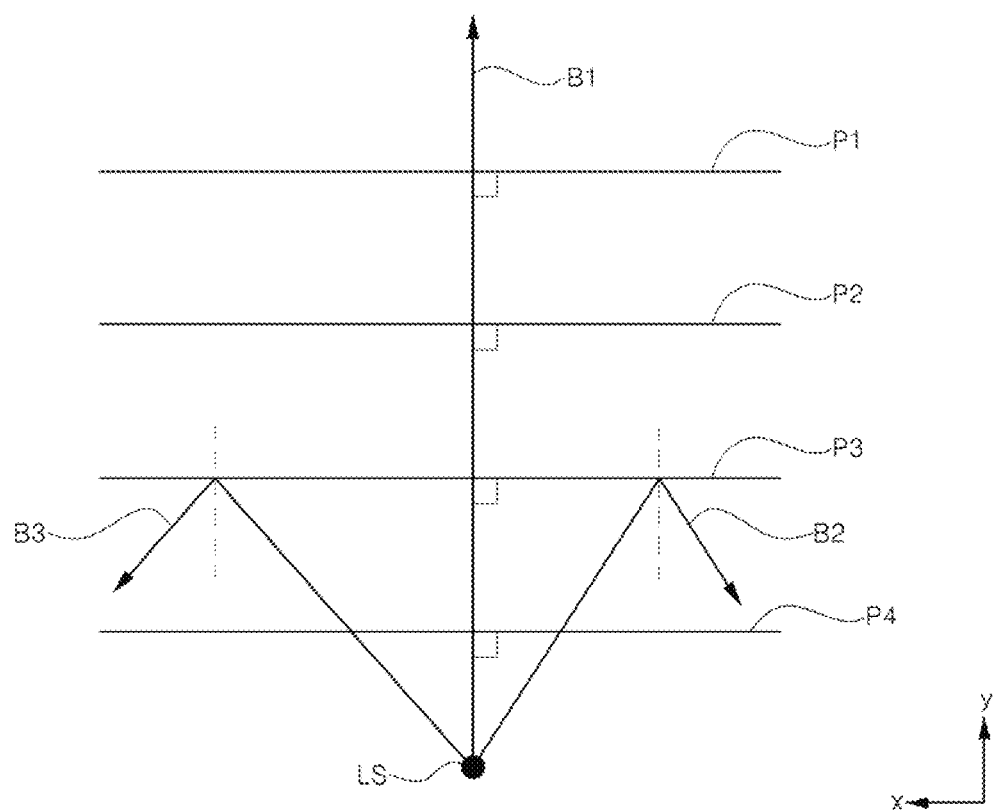
FIG. 4 is a view illustrated to explain a generative principle of a line-shaped beam of the optical member of FIG. 1.

FIG. 4 is a view illustrated to explain a generative principle of a line-shaped beam of the optical member of FIG. 1. FIG. 4 may correspond to a partial magnified view of the plurality of unit patterns as viewed from above the pattern arrangement surface 112 of the base substrate 10 of FIG. 2.

Referring to FIG. 4, when a plurality of unit patterns P1, P2, P3, P4 are sequentially arranged from the light source LS in the y direction (as depicted in FIGS. 1 and 4), light of the light source LS can be implemented as a line shaped beam B1 which travels in a direction (the y direction as depicted in FIGS. 1 and 4) crossing at right angles to each of unit pattern extension directions (e.g., the x direction as depicted in FIGS. 1 and 4) of the plurality of unit patterns.

That is, the plurality of unit patterns and the inclined surfaces thereof can be structurally arranged on the first surface of the base substrate such that any beam of incident light that strikes a unit pattern at a right angle to the pattern extension direction (e.g., x-direction as depicted in FIGS. 1 and 4) in which said unit pattern extends is guided away from the optical member.

Also, in implementing the line-shaped beam according to a pattern design, the plurality of unit patterns P1, P2, P3, P4 can guide second incident beams to a direction except for a direction of the first path according to refraction and/or reflection of the inclined surface. Here, the second incident beams may be beams (hereinafter, ambient beams) that meet the inclined surface while having an incidence angle corresponding to the pattern extension directions and directions between an +y direction and +x direction and between the +y direction and an −x direction (for example, a direction within a first quadrant and a fourth quadrant of both sides of the first path proceeding to a +y axis on the xy plane on the basis of the light source) on the plane defined by the first path, and are refracted or reflected by the inclined surface, among beams from the light source LS toward the inclined surface. In this case, the second incident beams can be distributed in a relatively wide range by the inclined surface, and accordingly, in this case, the second incident beams can become ambient beams B2, B3 that form a peripheral part having relatively low brightness on the periphery of a bright space compared to a line shape beam part (hereinafter, the bright space) resulting from the first incident beams, or a dark space when viewed from a virtual point (a reference point, an observing point and the like) on a straight line which crosses to the x-y plane (which corresponds to a surface being parallel to the first surface or the second surface of the base substrate).

In the present embodiment, the pattern extension directions may be extension directions of straight lines extending along longitudinal directions of the stripe patterns on the respective inclined surface of the plurality of unit patterns.

That is, when the pattern extension directions of the plurality of unit patterns are designed to be parallel to each other upon designing the patterns, the optical path (a first path) of light passing through the plurality of unit patterns can have a straight lined shape in which the optical path starts from the unit patterns of a point meeting light from the light source for the first time and is moved to directions crossing at right angles to the pattern extension directions of the respective unit patterns.

Also, according to some embodiments, when the pattern extension directions of the plurality of unit patterns are designed not to be parallel to each other but to cross each other at at least one point or to extend in a radial direction (see, e.g., FIG. 9), the optical path (the first path) of light passing through the plurality of unit patterns may be implemented in a curved form in which the optical path starts from the unit patterns of a point meeting light from the light source for the first time and is bent to a side in which a distance between the adjacent unit patterns is narrow. This is because the plurality of unit patterns guide movement of the light to the optical path of the least time according to the Fermat principle that 'a ray of light moving within a medium moves along a moving path of the least time.'

Figure 5:
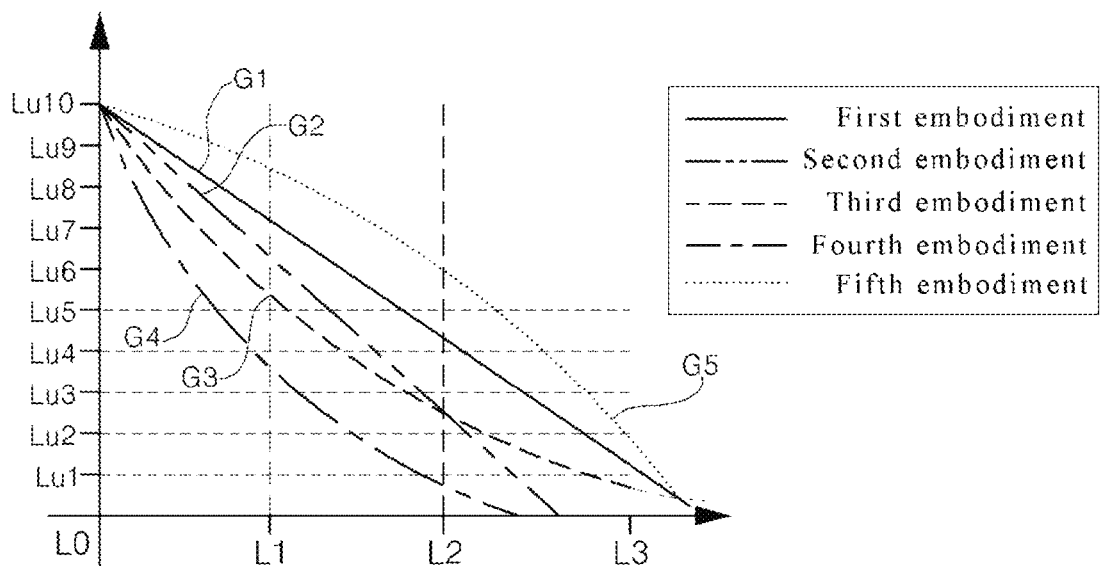
FIG. 5 is a view showing brightness for each area with regard to a three-dimensional effect beam of the optical member of FIG. 1.

FIG. 5 is a view showing brightness for each area of a three-dimensional effect beam of the optical member of FIG. 1.

Referring to FIG. 5, with respect to the plurality of unit patterns of the optical member according to certain embodiments, the plurality of unit patterns sequentially arranged from the light source can be divided into the unit patterns of multiple areas (e.g., three areas), and reviewing brightness for the unit patterns in each of the areas, the plurality of unit patterns can be implemented to have brightness in different ranges from each other according to a distance from the light source.

For example, when the plurality of unit patterns are divided into first unit patterns of a first area A1, second unit patterns of a second area A2 and third unit patterns of a third area A3 (see, e.g., FIG. 2), a second brightness of the second unit patterns can be lower than a first brightness of the first unit patterns and can be higher than a third brightness of the third unit patterns. A second distance L2 between the unit pattern farthest away from the light source among the second unit patterns and the light source can be longer than a first distance L1 between the unit pattern farthest away from the light source among the first unit patterns and the light source, and can be shorter than a third distance L3 between the unit pattern farthest away from the light source among the third unit patterns and the light source.

More specifically, when a maximum brightness of the nearest unit pattern to the light source is level 10 Lu10, the specific first unit pattern positioned at the first distance L1 from the light source may have a brightness value of level 8 Lu8, level 7 Lu7, level 6 Lu6, level 5 Lu5 or level 4 Lu4 according to different pattern designs of different embodiments (e.g., a first embodiment to a fifth embodiment). Also, the specific second unit pattern positioned at the second distance L2 from the light source may have a brightness value of about level 6 Lu6, level 4 Lu4, level 2 Lu2 or level 1 Lu1. Furthermore, the specific third unit pattern positioned at the third distance L3 from the light source may have a brightness value of about level 2 Lu2, level 1 Lu1 or level 0 (i.e., no brightness exists).

That is, the plurality of unit patterns previously explained with reference to FIGS. 1 and 2, each of the unit patterns serves as an indirect light source emitting light having a fixed brightness by refracting and/or reflecting light of the light source, and at this time, the plurality of unit patterns may be implemented as indirect light sources having brightness values different from each other which are sequentially reduced according to pattern designs or arrangement structures.

Referring again to FIG. 5, according to a pattern design or an arrangement structure of an embodiment (e.g., a first embodiment), as shown in a brightness curve G1 of the first embodiment, the first unit pattern can serve as an indirect light source having a brightness value of level 10 to level 7, the second unit pattern can serve as an indirect light source having a brightness value of level 7 to level 4, and the third unit pattern can serve as an indirect light source having a brightness value of about level 4 to level 1. Such a configuration may implement three-dimensional effect beams in which brightness is uniformly reduced at the plurality of unit patterns as a distance from the light source is increased. In order to implement the three-dimensional effect beams, the plurality of unit patterns may be designed so as to have uniform pitches.

Also, according to a pattern design or an arrangement structure of an embodiment (e.g., a second embodiment), as shown in a brightness curve G2 of the second embodiment, the first unit pattern can serve as an indirect light source having a brightness value of level 10 to level 6, the second unit pattern can serve as an indirect light source having a brightness value of level 6 to level 3, and the third unit pattern can serve as an indirect light source having a brightness value of about level 3 to level 0. Such a configuration may implement a three-dimensional effect beam in which brightness is substantially, uniformly and rapidly reduced at the plurality of unit patterns as a distance from the light source is increased. In order to implement the three-dimensional effect beam, the plurality of unit patterns may be designed so that pitches are reduced as the distance from the light source is increased or so that a pattern density per a unit length is increased at a certain ratio.

Also, according to a pattern design or an arrangement structure of an embodiment (e.g., a third embodiment), as shown in a brightness curve G3 of the third embodiment, the first unit pattern can serve as an indirect light source having a brightness value of level 10 to level 5, the second unit pattern can serve as an indirect light source having a brightness value of level 5 to level 2, and the third unit pattern can serve as an indirect light source having a brightness value of about level 2 and level 1. Such a configuration may implement a three-dimensional effect beam in which a reduction rate in brightness between the first area A1 and the second area A2 is larger than that between the second area A2 and the third area A3 as a distance from the light source is increased. In order to implement the three-dimensional effect beam, the plurality of unit patterns may be designed to have uniform pitches which are narrower than those of the first embodiment or the plurality of unit patterns may be provided so that pitches are increased as the distance from the light source is increased.

Also, according to a pattern design or an arrangement structure of an embodiment (e.g., the fourth embodiment), as shown in a brightness curve G4 of the fourth embodiment, the first unit pattern can serve as an indirect light source having a brightness value of level 10 to level 4, the second unit pattern can serve as an indirect light source having a brightness value of level 4 to level 1, and the third unit pattern can serve as an indirect light source having a brightness value of about level 1 and level 0. Such a configuration may implement a three-dimensional effect beam in which brightness is relatively rapidly reduced compared to the case of the third embodiment. In order to implement the three-dimensional effect beam, the plurality of unit patterns may be designed to have uniform pitches which are narrower than those of the first embodiment or the plurality of unit patterns may be provided so that pitches are reduced little by little as the distance from the light source is increased.

Also, according to a pattern design or an arrangement structure of an embodiment (e.g., the fifth embodiment), as shown in a brightness curve G5 of the fifth embodiment, the first unit pattern can serve as an indirect light source having a brightness value of level 10 to level 8, the second unit pattern can serve as an indirect light source having a brightness value of level 8 to level 6, and the third unit pattern can serve as an indirect light source having a brightness value of about level 6 to level 2. Such a configuration may implement a three-dimensional effect beam in which a reduction rate in brightness between the first area A1 and the second area A2 is smaller than that between the second area A2 and the third area A3 as a distance from the light source is increased. In order to implement the three-dimensional effect beam, the plurality of unit patterns may be designed to have uniform pitches which are wider than those of the first embodiment or the plurality of unit patterns may be provided so that pitches are reduced little by little as the distance from the light source is increased.

In the first to fifth embodiments discussed above, it is assumed that the pattern structures of the respective embodiments and reflection abilities of the inclined surfaces of the respect unit patterns are identical to each other, and if a difference in the pattern structures or the reflection abilities of the unit patterns exists, by adjusting the pitches and pattern design in consideration of the difference, a reduction effect in brightness can be naturally obtained by an indirect light source effect of the sequentially arranged plurality of unit patterns.

According to certain embodiments, a three-dimensional effect beam or a line-shaped beam with a three-dimensional effect may be implemented by the effect of a reduction in brightness as descried above and the indirect light source effect of patterns resulting from a difference in distance from the light source, namely, a difference in optical path.

Figure 6:
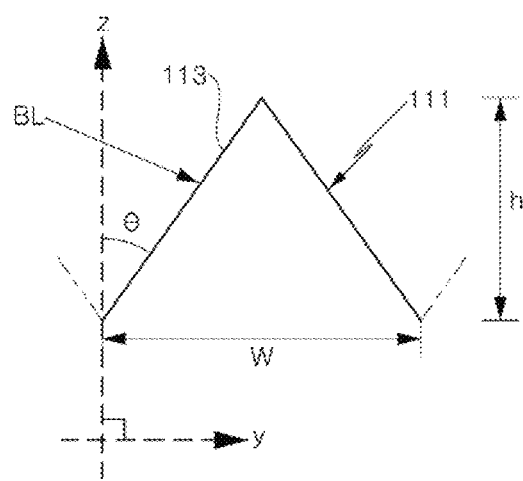
FIG. 6 is a view illustrated to explain an embodiment of a pattern structure of the optical member of FIG. 1.

FIG. 6 is a view illustrated to explain an embodiment of a pattern structure of the optical member of FIG. 1.

Referring to FIG. 6, in an embodiment, the unit pattern 111 of the patterns of the optical member can have a triangular cross-sectional shape. That is, a cross section of an inclined surface of the unit pattern 111 may have a straight lined-shape. When the unit pattern 111 has a triangular sectional structure, the inclined surface 113 can have a predetermined inclination angle with respect to a pattern arrangement surface of the y direction (as depicted in FIG. 6). In another aspect, the inclined surface 113 may be formed to be inclined at a predetermined inclination angle θ with respect to a direction (the z direction as depicted in FIG. 6) which crosses at right angles to the pattern arrangement surface.

The inclination angle θ can be, for example, more than about 5° and less than about 85°. In an embodiment, the inclination angle θ can be in a range of from 5° to 85°. The inclination angle θ may be designed in consideration of a refractive index of the base member and may be appropriately designed in the range of 5° to 85° according to the refractive index of the base substrate.

In an embodiment, when a refractive index of the base substrate is about 1.30 to 1.80, an inclination angle of the inclined surface 113 of each of the unit patterns 111 may be in the range which is more than about 33.7° and less than about 50.3° (or from 33.7° to 50.3°) on the basis of the pattern arrangement surface or may be in the range which is more than about 49.7° and less than about 56.3° (or from 49.7° to 56.3°) on the basis of the z direction (as depicted in FIG. 6).

Also, according to some embodiments, the base substrate may be formed using a material having a high refractive index. For example, when a high intensity LED is manufactured, when light having a specific incidence angle passes through a die and penetrates a capsule material, since total internal reflection occurs due to a difference in n values (refractive index) between the semiconductor die (n=2.50~3.50) and the general polymeric capsule element (n=1.40~1.60), light extraction efficiency of a device is reduced, and accordingly, in order to appropriately settle this problem, a high refractive polymer (n=1.80~2.50) can be used. In an embodiment, the plurality of unit patterns may be prepared by utilizing, e.g., a high refractive polymer (n=1.80~2.50) used in manufacturing high intensity LEDs. In this case, an inclination angle of the inclined surface of each of the unit patterns according to the present embodiment may have a range of more than 23.6° and less than about 56.3° (or from 23.6° to 56.3°) according to a refractive index of the base substrate or a high refractive material.

Also, in order to adjust a refractive index, at least one refractive index controlling layer may be formed on the plurality of unit patterns. The refractive index controlling layer may be a transparent material (or a virtually transparent material) having a refractive index different from that of the base member.

As described above, the inclined surface of the pattern of the optical member according to the present embodiment may be formed so as to have an inclination angle θ between about 5° to about 85° according to optical images to be implemented or a refractive index of a constitutive material.

The inclination angle according to the aforesaid refractive index follows Snell's law, and Snell's law is represented by the following math formula 1 with reference to FIG. 3.

[Math Formula 1]

$\sin \theta_1 / \sin \theta_2 = n_2 / n_1$

In Math Formula 1 above, $\sin \theta_1$ represents a traveling angle or incidence angle of light with respect to a first refractive index $n_1$, and $\sin \theta_2$ represents a traveling angle or incidence angle of light with respect to a second refractive index $n_2$.

Referring again to FIG. 6, the respective unit patterns 111 may be prepared in a predetermined ratio of a width w to a height h of a pitch or a bottom surface for convenience of a manufacturing process upon designing the patterns. For example, when the optical member is implemented so as to emphasize a three-dimensional effect of the 3D effect beam, a width w of the unit pattern can be equal to or smaller than a height h. Also, when the optical member is implemented so as to have a line-shaped optical image that is relatively long and has a three-dimensional effect, the width w can be greater than the height h.

As such, in an embodiment, the optical image of the 3D effect beam to be implemented through the optical member may be controlled by using the width W and height h of each of the unit patterns 111 as factors for the control of characteristics.

Also, according to an embodiment, a distance (corresponding to a pitch or a width w) between two adjacent unit patterns among the plurality of unit patterns may range from, for example, 10 to 500 μm. This distance may refer to an average distance among the plurality of unit patterns in the first path and may be selected or adjusted according to a pattern design, an arrangement structure or the shape of a desired optical image.

Meanwhile, according to some embodiments, the plurality of unit patterns may have a structure in which the unit patterns are concavely inserted into the inside of the base substrate at the first surface or the pattern arrangement surface of the base member. Like the aforesaid case, in this case, the inclined surface can have a predetermined angle with respect to the z direction, and when a ratio (h/w) of a width of the respective unit patterns to a height is designed to be smaller than 1, it is advantageous in that it is easy to manufacture the patterns compared to patterns in which a ratio (h/w) of a width of the respective unit patterns to a height is 1 or more.

Figure 7:
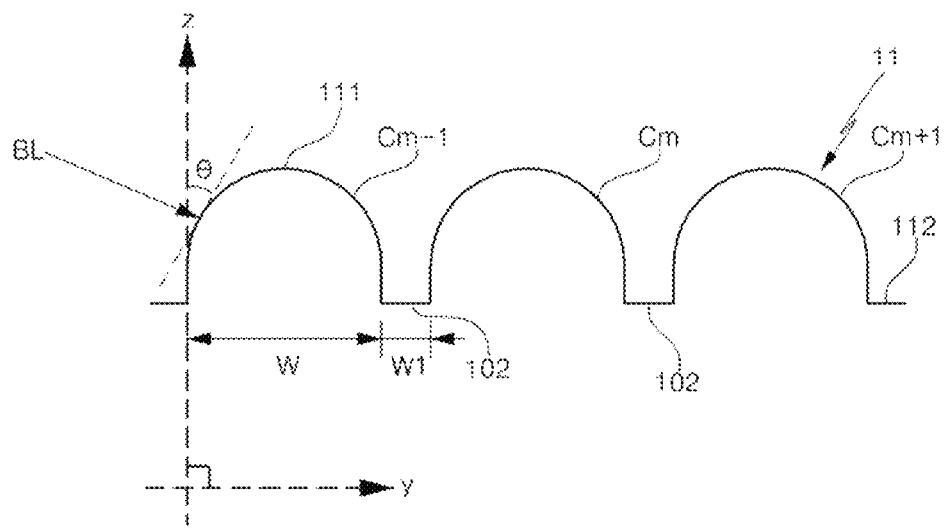
FIG. 7 a view illustrated to explain another embodiment of a pattern structure of the optical member of FIG. 1.

FIG. 7 a view illustrated to explain another embodiment of a pattern structure of the optical member of FIG. 1.

Referring to FIG. 7, in an embodiment, when designing the patterns 11 of the optical member, the respective unit patterns 111 may have a lenticular structure or a semicircular pillar structure. That is, the cross section of each of the unit patterns 111 may be formed in a semicircular sectional structure or a circular sectional structure (e.g., as depicted in FIG. 7).

Also, in many embodiments, a spaced portion, such as spaced portion 102 depicted in FIG. 7, may be disposed between two adjacent unit patterns 111. Such a spaced portion can be disposed between all adjacent unit patterns 111, or between only a portion, such as only two, unit patterns 111.

For example, when the plurality of unit patterns include a first unit pattern Cm−1, a second unit pattern Cm and a third unit pattern Cm+1 (here, m represents natural numbers of 2 or greater), the spaced portion 102 may be disposed between the first unit pattern Cm−1 and the second unit pattern Cm and between the second unit pattern Cm and the third unit pattern Cm+1, respectively. The spaced portion 102, which is a gap between two adjacent unit patterns, may be provided for convenience of a manufacturing process. In many embodiments, the spaced portion 102 may be omitted according to a pattern design for specific implementation.

In an embodiment, the inclined surface of the respective unit patterns 111 becomes a surface which comes into contact with an arc-shaped virtual point. That is, a tangent line which comes into contact with the virtual point on the unit pattern 111 is placed at a predetermined inclination angle θ in a direction (e.g., the z direction as depicted in the figures) which crosses at right angles to the pattern arrangement surface 112. The inclination angle θ may be less than 90° and more than 0° according to a position of an arc-shaped surface hit by the beams BL.

In an embodiment, when the unit pattern 111 has a lenticular shape which is easy to be manufactured, a ratio of a width to a height of the unit pattern 111 may be about ½ or less or an inclination angle θ of the unit pattern may be about 60°.

Figure 8:
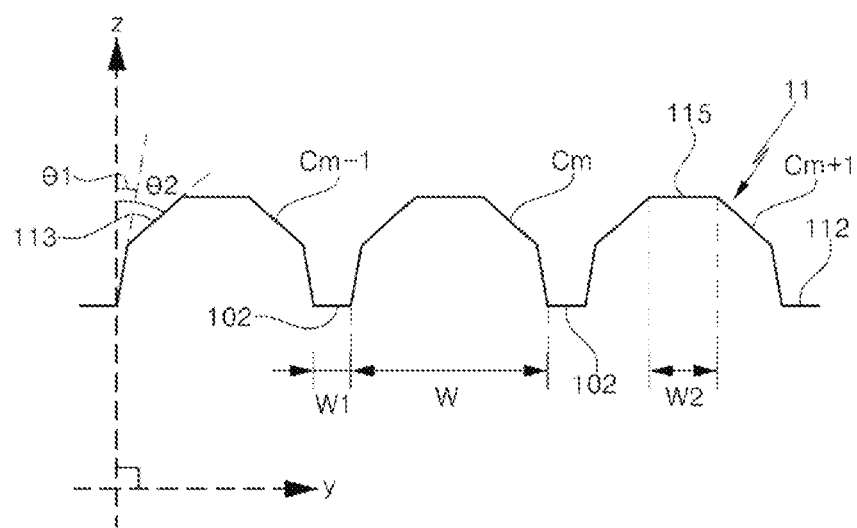
FIG. 8 a view illustrated to explain a further embodiment of a pattern structure of the optical member of FIG. 1.

FIG. 8 is showing an embodiment of a pattern structure of the optical member of FIG. 1.

Referring to FIG. 8, when designing the patterns 11 of the optical member of the present embodiment, the unit pattern 111 may have a polygonal sectional shape. That is, a cross section of the inclined surface of the unit pattern 111 may have a line graph-like shape.

In an embodiment, the inclined surface 113 of each of the unit patterns 111 may be formed so as to have plurality of inclination angles θ1, θ2, etc. according to the number of line segments of a line graph in a direction (the z direction as depicted in FIG. 8) which crosses at right angles to the pattern arrangement surface 112. The second inclination angle θ2 may be larger than the first inclination angle θ1 or vice versa or the inclination angles may be the same. The first and second inclination angles θ1, θ2 may be designed within a range of more than about 5° and less than about 85° (or from 5° to 85°) according to a position hit by beams BL.

Also, in an embodiment, a spaced portion 102 may be provided between two adjacent unit patterns. That is, when the plurality of unit patterns include a first unit pattern Cm−1, a second unit pattern Cm, and a third unit pattern Cm+1, the spaced portion 102 may be provide between the first unit pattern Cm−1 and the second unit pattern Cm, and between the second unit pattern Cm and the third unit pattern Cm+1. A width w1 of the spaced portion 102 can be smaller than a width w of the unit pattern so that a natural line-shaped beam or a three-dimensional effect beam can be implemented on the pattern 11, though embodiments are not limited thereto. The width w1 of the spaced portion 102 may be less than 1/10 of the width w of the unit pattern. In order to implement a line-shaped beam or a three-dimensional effect beam having a desired shape, the width w1 of the spaced portion 102 may be formed to be small if possible or the spaced portion 102 itself may be omitted. When the spaced portion 102 is provided, the spaced portion 102 can be designed to have a width of, for example, several micrometers (μm) or less.

Also, in an embodiment, the pattern 11 may have a disconnected surface 115, which is parallel to the pattern arrangement surface 112, on the unit pattern 111. The disconnected surface 115 may be a part which does not substantially emit light to the outside, and in a particular embodiment, a width w2 of the disconnected surface 115 may be limited in a range of several micrometers or less for implementing desired line-shaped beams having a continuous line-like shape because the line-shaped beams implemented by the plurality of unit patterns may have a disconnected part corresponding to the disconnected surface 115.

Figure 9:
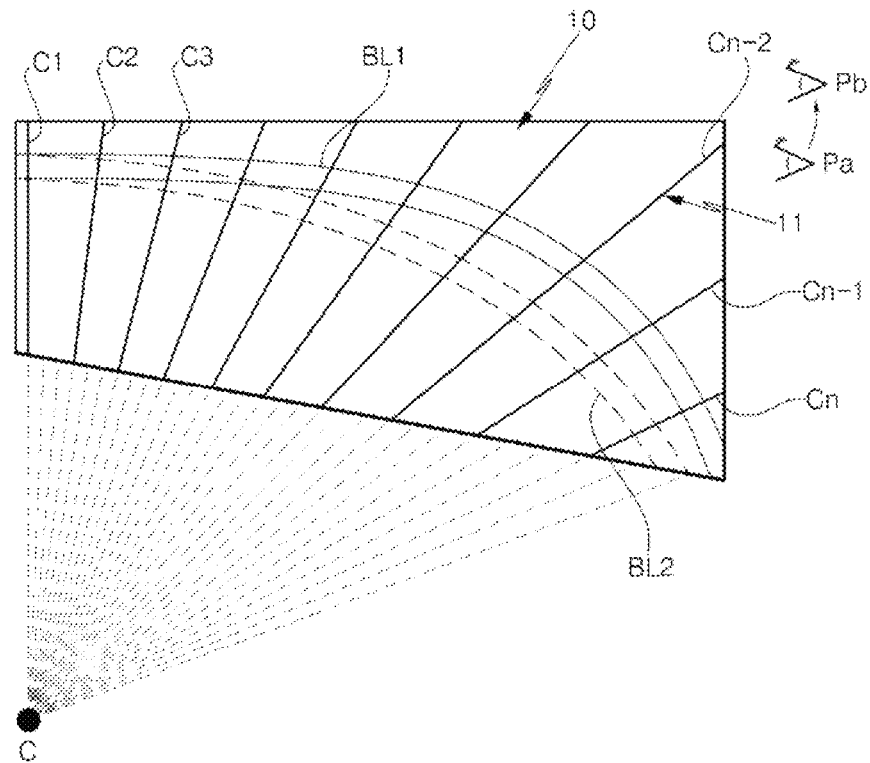
FIG. 9 is a plan view of an optical member according to another embodiment of the present invention.

FIG. 9 is a plan view of an optical member according to another embodiment of the present invention.

Referring to FIG. 9, the pattern 11 of the optical member can include a plurality of unit patterns provided in a structure in which pattern arrangement directions cross each other at the pattern arrangement surface of the base substrate 10. The plurality of unit patterns can include, for example, a first unit pattern C1, a second unit pattern C2, a third unit pattern C3, and an n-second unit pattern Cn−2, an n−1 unit pattern Cn−1 and an n unit pattern Cn. Here, n represents a natural number of 6 or greater. The plurality of unit patterns can be arranged to extend in a direction in which the plurality of unit patterns are not parallel to each other. That is, the pattern extension directions of the plurality of unit patterns can be non-parallel, and virtual extension lines of the plurality of unit patterns may meet at one cross point C. In an embodiment, all pattern extension directions are non-parallel to each other. In a further embodiment, a portion (that is less than all) of the pattern extension directions are non-parallel to each other.

According to an embodiment, when light of the light source is incident to the pattern 11, the plurality of unit patterns can implement a first line-shaped beam BL1 that is bent to a side in which the pattern extension directions cross each other, e.g., a side in which the cross point C is present, while having a curvature, and can move along a first path (an optical path).

Also, according to an embodiment, the plurality of unit patterns can implement a second line-shaped beam BL2 moving along another first path instead of a first line-shaped beam BL1 moving along a first path as a reference point or an observer (a person, camera, etc.) observing the first line-shaped beam BL1 can move from a first point Pa to a second point Pb. This is because a position of the first path, which crosses at right angles to the pattern extension directions of the plurality of unit patterns, is moved in a direction opposed to a moving direction. As such, the plurality of unit patterns may implement various line-shaped beams of various optical images (a straight lined shape, a curve shape or a combination thereof) which travel along the pattern extension directions of the plurality of unit patterns according to the position of a reference point or an observing point.

Figure 10:
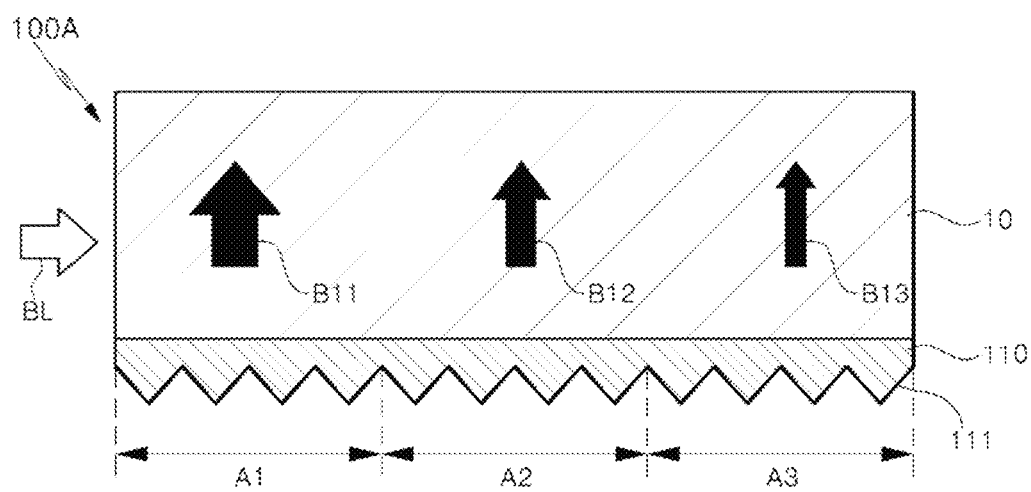
FIG. 10 is a cross-sectional view of the optical member according to a further embodiment of the present invention.

FIG. 10 is a cross-sectional view of the optical member according to a further embodiment of the present invention.

Referring to FIG. 10, in an embodiment, an optical member 100A can include a base substrate 10 and a pattern layer 110. The pattern layer 110 can be bonded onto the second surface of the base substrate 10 and can have the plurality of unit patterns 111 exposed to the second surface of the base substrate 10.

The optical member 100A according to an embodiment can be substantially identical to the optical member 100 previously explained with reference to FIGS. 1 and 2 except for the fact that the plurality of unit patterns 111 can be provided by bonding the separate pattern layer 110 onto one surface of the base substrate 10 rather than being directly provided by removing a part of one surface of the base substrate 10.

In an embodiment, when the plurality of unit patterns are provided using the separate pattern layer 110, the base substrate 10 and the pattern layer 110 may have the same refractive index. Alternatively, the base substrate 10 and the pattern layer 110 may have a fixed difference in refractive index. As one example, the refractive index of the base substrate 10 may be about 0.2 or less smaller than that of the pattern layer 110. When the difference in refractive index is used, the refraction efficiency and/or reflection efficiency of incident light can be improved at the plurality of unit patterns of the pattern layer 110 disposed between the base substrate and the atmosphere, and accordingly, line-shaped beams can be effectively implemented. When the refractive index difference exceeds 0.2, the total reflection of incident beams may be generated from a boundary between the base substrate 10 and the pattern layer 110.

In an embodiment, in areas A1, A2, A3 according to a distance from the light source illuminating beams, the line-shaped beams may have optical images resulting from irradiating beams B11, B12, B13 having different brightness values which are gradually reduced in the areas A1, A2, A3 having a difference in optical path and sequentially arranged from the light source to the first surface direction.

Figure 11:
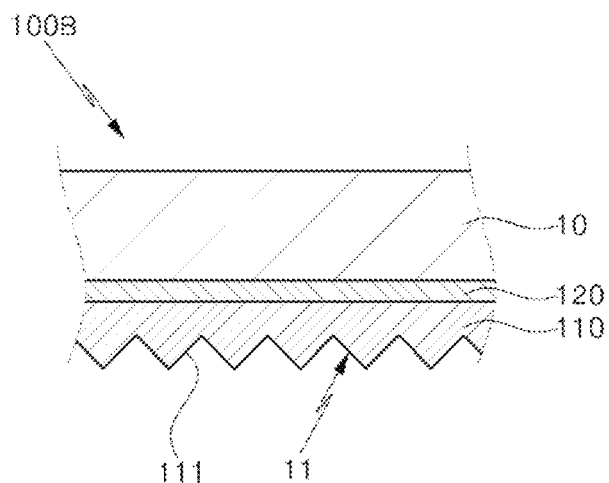
FIG. 11 is a cross-sectional view for a modified example of the optical member of FIG. 10.

FIG. 11 is a cross-sectional view for a modified example of the optical member of FIG. 10.

Referring to FIG. 11, in an embodiment, an optical member 100B can include a base substrate 10, a pattern layer 110 and an adhesive layer 110 between the base substrate and the pattern layer 110. The optical member 100B can be substantially identical to the optical member 100A previously explained with reference to FIG. 10 except for the adhesive layer 120.

The adhesive layer 120 may be provided with an epoxy adhesive film or an epoxy adhesive. Also, in order to adjust a difference in refractive index between the base substrate 10 and the pattern layer 110, the adhesive layer 120 may be made of, for example, PEA (Phenoxyethyl acrylate), which is a high refraction material, a fluorinate polymer, a fluorinate monomer or the like, though embodiments are not limited thereto. A refractive index of the adhesive layer 120 may be larger than that of the base substrate 10 and that of the pattern layer 110. In such a case, when a difference between the refractive index of the base substrate 10 and the refractive index of the pattern layer 110 is small, light passing through the adhesive layer 120 from the base substrate 10 can be refracted at a predetermined angle, and can then be refracted in an opposite direction of the predetermined angle while traveling to the pattern layer 110 again, thereby enabling the light to travel in a similar direction to an original traveling direction. Of course, when a thickness of the adhesive layer 120 is very thin, the refraction angle may be ignored.

In an embodiment, the adhesive layer 120 can be provided between the base substrate 10 and the pattern layer 110 and can be made of a material having low reflectance. Otherwise, light from the light source will not properly reach the plurality of unit patterns, and accordingly, it will be difficult for the plurality of unit patterns to implement line-shaped beams or line-shaped beams with a 3D effect.

Figure 12:
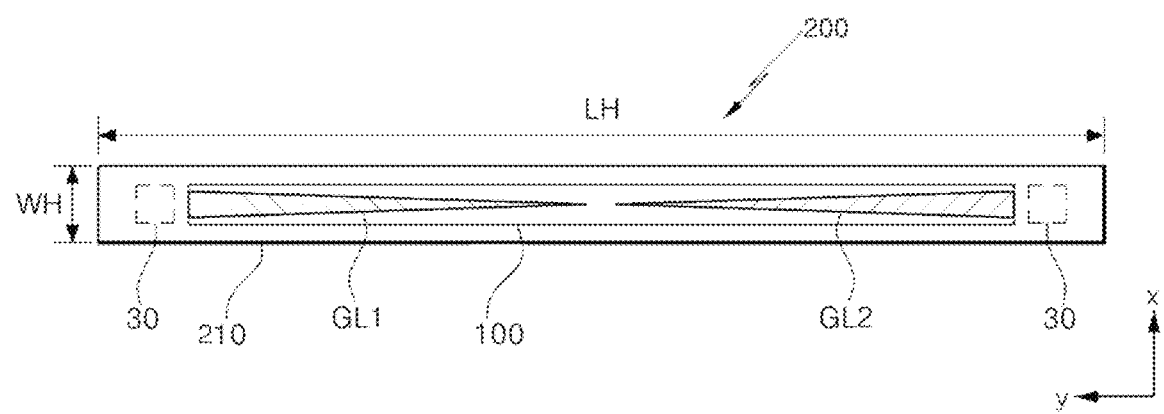
FIG. 12 is a plan view of a lighting device according to an embodiment of the present invention.

FIG. 12 is a plan view of a lighting device according to an embodiment of the present invention.

Referring to FIG. 12, in an embodiment, a lighting device can include an optical member 100, a light source unit 30, and a support member 210. The lighting device 200 can have a predetermined length LH and width WH on the plane. The length LH and width WH may be configured to be identical to or similar to a length and diameter of a 20 W fluorescent lamp, a 40 W fluorescent lamp or the like.

The optical member 100 can be an optical member as described herein, such as the optical member previously described with reference to FIGS. 1 and 2. Also, for example, the optical member previously explained with reference to FIGS. 10 and 11 may be used as the optical member 100.

The light source unit 30 can be disposed at both ends of the support member 210, respectively, in a longitudinal direction of the support member 210 so that light having an optical effective area in a hemisphere area form can be irradiated toward a central part of the support member 210 having a rectangular bar-like shape. In such a case, the light source unit 30 may include a first light source and a second light source, and the first light source and the second light source may be disposed to irradiate light in directions opposed to each other.

Figure 18:
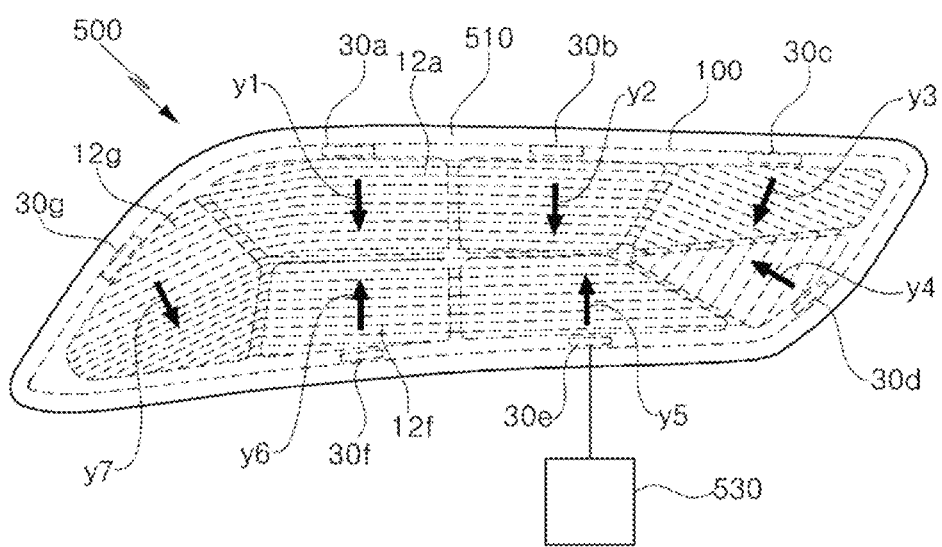
FIG. 18 is a plan view for a lighting device according to yet another embodiment of the present invention.

In an embodiment of the lighting device 200, the first light source and the second light source may be implemented so as to irradiate beams which cross each other in directions opposed to each other (see, e.g., reference numerals 30c and 30d of FIG. 18).

In an embodiment, the light source unit 30 may be prepared using an artificial light source which is one of various existing light sources, such as incandescent lamps, halogen lamps, discharge lamps and the like in addition to LED light sources including LED (light emitting diode) elements, or the light source unit 30 may be prepared using an inducement member or reflection member for inducing or reflecting natural light from the sun. When LED light sources are used, the light source unit 30 may further include a drive circuit supplying power to the LED light sources. A printed circuit board to which the drive circuit is mounted may also be provided.

The support member 210 may be at least a part of the housing of the lighting device 200, a wall inside or outside a building, or one surface of a device or apparatus. The support member 210 may be implemented using devices or apparatuses without being specially limited thereto if the devices or apparatuses enable the optical member 100 to be disposed at a position in which light is irradiated. Furthermore, the support member 210 may be implemented using, for example, hats, clothes, shoes, bags, accessories, indoor and outdoor decoration components and the like.

In many embodiments, the light source unit can be structurally arranged such that an artificial three-dimensional effect is generated whereby at least a portion of light reflected from the plurality of unit patterns appears to a viewer (e.g., a view above the optical member) to originate from a depth below the optical member.

In an embodiment, light irradiated from two light source units 30 to a central part of the support member 210 may implement illumination resulting from line-shaped beams with a 3D effect generated from both ends of the support member 210 by a refraction and/or reflection reaction of the plurality of unit patterns and disappear in the central part of the support member 210.

As the optical member 100 is disposed on the support member 210 and light is irradiated to the optical member from one side of the optical member 100, line shaped beams having specific optical paths may be implemented by the plurality of unit patterns of the optical member, and line shaped beams with three-dimensional effect GL1, GL2 having a perceptional depth in a direction vertical to the pattern arrangement surface may be implemented by a difference in optical paths resulting from a distance with the light source.

Figure 13:
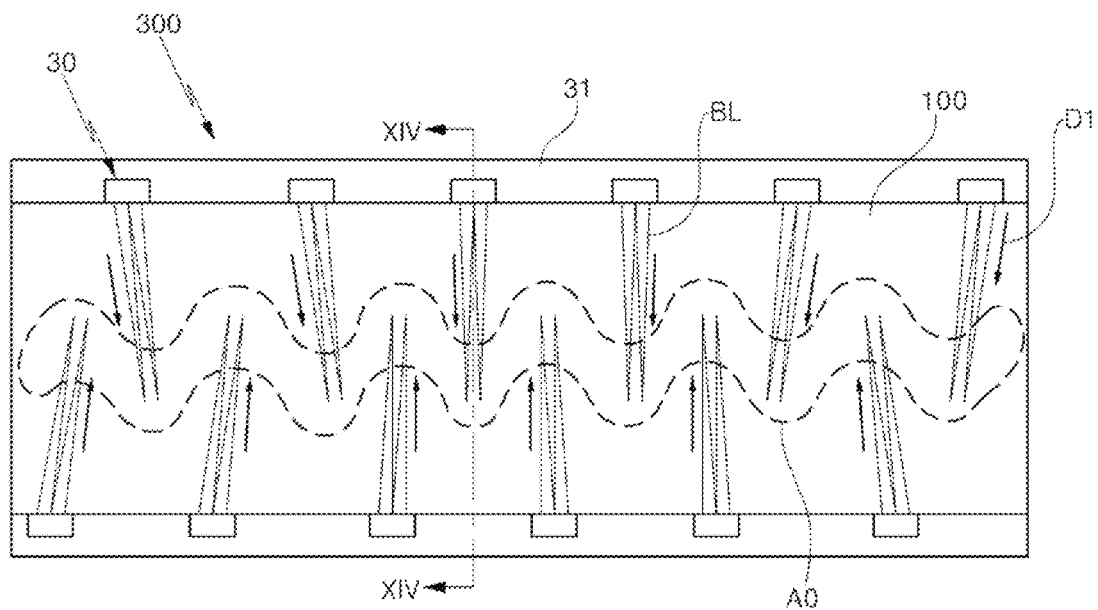
FIG. 13 is a plan view of a lighting device according to another embodiment of the present invention.
Figure 14:
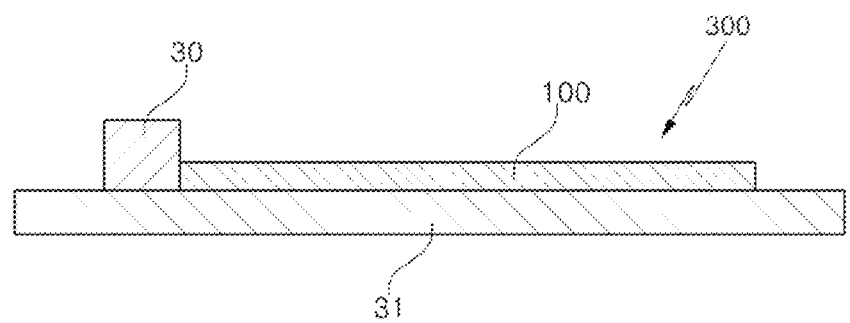
FIG. 14 is a schematic cross-sectional view taken along lines XV-XV of the lighting device of FIG. 13.

FIG. 13 is a plan view of a lighting device according to another embodiment of the present invention. FIG. 14 is a schematic cross-sectional view taken along lines XV-XV of the lighting device of FIG. 13

Referring to FIGS. 13 and 14, in an embodiment, a lighting device can include a lighting plate 31, a light source unit 30 and an optical member 100. The lighting device 300 can provide illumination resulting from multiple line-shaped beams or line-shaped beams having a three-dimensional effect.

The optical member can be an optical member according the subject invention, such as, e.g., the optical member previously described with reference to FIGS. 1 and 2 or the optical member 100 previously explained with reference to FIGS. 10 and 11. However, the optical member 100 can include a plurality of groups of pattern unit patterns (e.g., twelve groups) provided in respective pattern regions corresponding to respective LED light sources, and the plurality of unit patterns of the respective groups can have different pattern extension directions (e.g., pattern extension directions extending in a direction which crosses at right angles to a first path for limiting an optical path of the light sources to the first path (D1 and the like).

The optical member 100 may be provided in a film or flat form. A thickness of the optical member 100 may be more than 25 μm and less than 10 mm (or in a range of 25 μm to 10 mm). When the thickness of the optical member 100 is less than 250 μm, the optical member may have a film-like shape and flexibility. When the thickness of the optical member 100 is less than 25 μm, due to a micro pattern structure, it is difficult to manufacture the optical member, and a yield or durability of the product may be largely decreased. Furthermore, when the thickness of the optical member 100 is thicker than 10 mm, it is disadvantageous in that the cost required for production and handling is increased.

The lighting plate 31 can support at least one of the housing or the light source unit 30 as a support member and the optical member 100. The lighting plate 31, which can be a separate member in a plate form, may be connected to a device, an apparatus, a building and the like or may be provided as a part of the device, apparatus, building, etc.

In some embodiments, the lighting plate 31 may include a substrate and multiple light source units 30 provided on the substrate. In this case, the lighting plate 31 may include an insulating substrate and a printed circuit board on the insulating substrate.

The light source units 30 may include multiple LED light sources. In an embodiment, the light source units 30 can include twelve LED light sources arranged in a state of being divided into two groups (e.g., in upper and lower side parts of the lighting plate, such as upper and lower side parts of one surface of the lighting plate 31) facing each other so that light is irradiated to the lighting plate 31 in directions which face each other. Each of the LED light sources can be configured such that two LED elements are formed in a single package, and irradiates two beams.

The light source units 30 can include a first light source and a second light source belonging to a first group or a second group. In such a case, the first light source and the second light source can irradiate beams in the same direction or irradiate beams which cross each other in an opposite direction.

In an embodiment, an optical width of the line-shaped beam may be less than a width of a light emitting surface of the LED light sources which irradiate light to the plurality of unit patterns of the respective pattern areas. The optical width and the width of the light emitting surface can correspond to a maximum width resulting from two beams on the plan view of FIG. 13 and a width of a surface in which beams are emitted from the light source units 30. In FIG. 14, a thickness of the light source unit 30 is illustrated to be thicker than that of the optical member 100, but the thickness is not limited thereto. In particular, a height (or a height from the lighting plate) of the light emitting surface of the light source unit 30 may be smaller than the thickness of the optical member 100 for effectively supplying incident light.

In an embodiment, when the plurality of unit patterns are not present, the light source units may irradiate light having an optical effective area in a hemisphere area form on the basis of the light emitting surface, but when the plurality of unit patterns are used, they can enable the light source units to irradiate line-shaped beams of less than a width of the light emitting surface within the optical effective area.

According to an embodiment, when the optical member is arranged on the lighting plate 31 having multiple LED light sources, and light of the LED light sources is irradiated to the optical member 100, planar illumination, resulting from various line-shaped beams with a 3D effect generated from both edges of the lighting device 300 being in a direction in which the LED light sources are disposed and disappear in a central area A0, may be implemented by a refraction and/or reflection reaction of the plurality of unit patterns provided in the respective pattern areas of the optical member 100.

Figure 15:
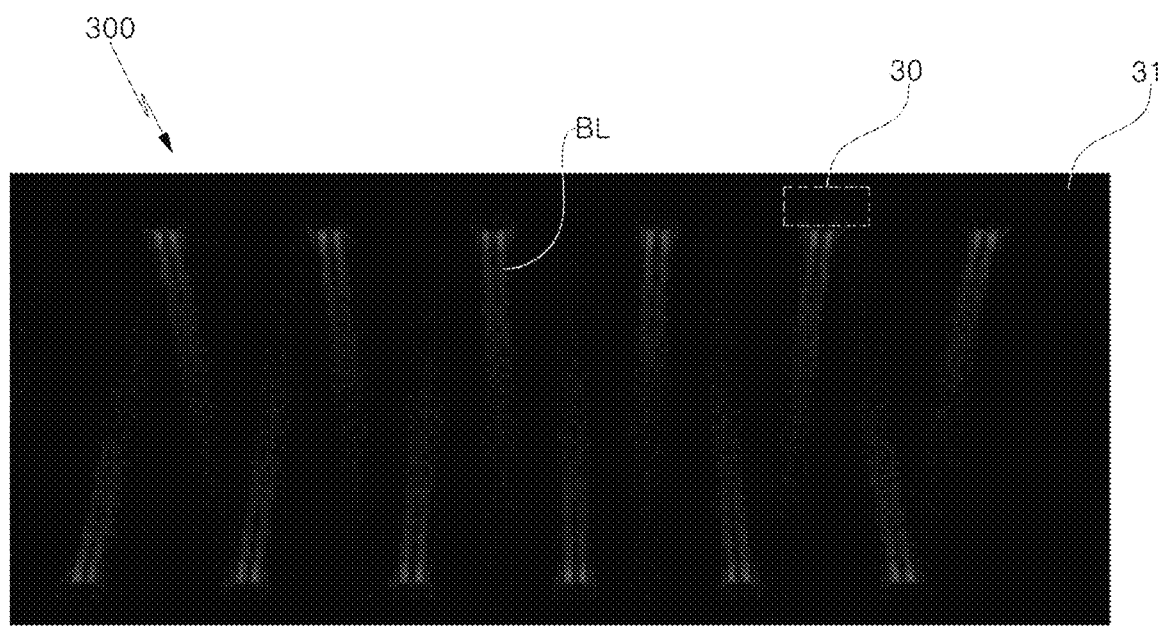
FIG. 15 is a view showing an operating state of the lighting device of FIG. 13.
Figure 16:
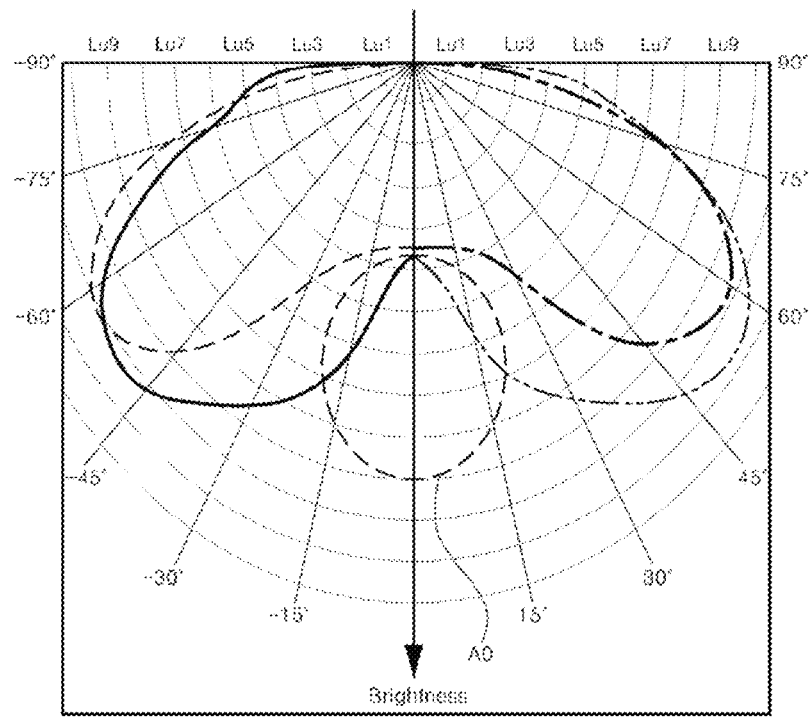
FIG. 16 is a graph showing measured brightness of the lighting device of FIG. 15.

FIG. 15 is a view showing an operating state of the lighting device of FIG. 13. FIG. 16 is a graph showing measured brightness of the lighting device of FIG. 15.

Referring to FIG. 15, in a lighting device 300 according to an embodiment of the present invention, when beams BL of twelve LED light sources 12 are irradiated to the optical member, twelve line-shaped beams are indicated by the unit patterns provided in different areas of the optical member. Also, due at least in part to the structural arrangement of the light source unit the lighting device 300 generates an artificial three-dimensional effect whereby at least a portion of light reflected from the plurality of unit patterns appears to a viewer to originate from a depth below the optical member.

The lighting device 300 can implement three-dimensional effect beams in which beams BL emitted from the respective LED light sources move along an arrangement direction of the unit patterns and disappear in a middle part of the pattern area in which the unit patterns are arranged.

As such, the lighting device 300 may provide illumination using the line-shaped beams with a 3D effect implemented in an optical path of a relatively very short distance (for example, about 100 to 200 mm) through a pattern design of the optical member.

Here, the very short distance may correspond to a short distance of '1/(hundreds to the thousands)' times (0.01 to 0.00001) or more compared to a distance (for example, dozens to hundreds of meters) in which light naturally reduces and disappears when the light moves on the optical member of a comparative example in which the plurality of unit patterns according to embodiments of the present invention are not provided.

When brightness of the lighting device 300 is measured using a fixed brightness measuring instrument disposed in a front central part of the device, a brightness graph as illustrated in FIG. 16 can be obtained.

Referring to FIG. 16, it can be seen that when a light intensity of the LED light sources is about maximum level 12 Lu12, a first brightness value (about Lu5) of a front central area A0 of the lighting device is relatively very small compared to a second brightness value (about Lu7 to about Lu12) of other areas. In particular, in consideration of the fact that the first brightness value of the central area A0 is influenced by the second brightness value of other ambient areas, the light intensity of the front central area A0 of the light device may be expected to be close to about level 0 (i.e., no brightness exists) practically.

According to an embodiment, by using line-shaped beams with a 3D effect of two groups extending in directions appropriately opposed to each other, there may be provided surface illumination within a rectangular illumination area, an edge of which has high brightness and a central part of which has low brightness.

Figure 17:
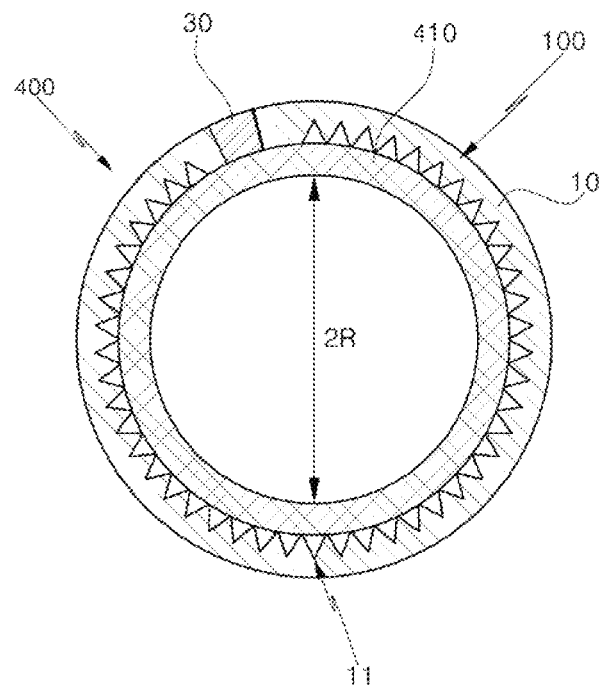
FIG. 17 is a cross-sectional view for a lighting device according to a further embodiment of the present invention.

FIG. 17 is a cross-sectional view for a lighting device according to an embodiment of the present invention.

Referring to FIG. 17, a lighting device 400 can include a base substrate 10, a pattern 11, a light source 30 and a support member 410. The optical member 100 can include the base substrate 10 and the pattern 11. The pattern 11 can have a plurality of unit patterns sequentially arranged on a pattern arrangement surface of the base substrate 10.

The optical member 100 can be provided in a film form. A thickness of the optical member 100 may range from, for example, 25 to 250 μm. When the thickness of the optical member 100 is less than 25 μm, it may be difficult to manufacture the optical member and durability may be largely reduced. Also, when the thickness of the optical member 100 is more than 250 μm, flexibility is largely reduced, and accordingly, it may be difficult to install the optical member at the support member 410 having a predetermined curvature.

The optical member 100 can be an optical member according to an embodiment of the subject invention, for example, those previously described with reference to FIGS. 1 to 11, except for the fact that the optical member 100 can be provided in the film form and has flexibility. That is, the optical member 100 can include a base substrate and a plurality of unit patterns sequentially arranged on a first surface of the base substrate and each having an inclined surface with an inclination angle with respect to a unit pattern inclination angle direction of the first surface, respectively. Each unit pattern inclination angle direction is parallel to the first surface, each unit pattern is extended in a pattern extension direction, respectively, and each pattern extension direction is parallel to the first surface and is perpendicular to the respective unit pattern inclination angle direction of the unit pattern which is extended in said pattern extension direction. The plurality of unit patterns and the inclined surfaces thereof can be structurally arranged on the first surface of the base substrate such that any beam of incident light that strikes a unit pattern at a right angle to the pattern extension direction in which said unit pattern extends is guided away from the optical member.

The optical member can implement line shaped beams with a 3D effect having a perceptional depth according to a difference in distance with the light source in the first path in such a manner as to control a structure, pitch, and pattern density of the unit patterns provided on the pattern arrangement surface of the base substrate 10, and thus limit a width of the first path while guiding an optical path for light irradiated from the light source unit 30 to the pattern to the first path.

The light source unit 30 can be supported by the support member 410 and can be disposed so as to irradiate light to one side of the optical member 100. The light source unit 30 may be configured of LED packages including one or two or more LED elements or LED strings. When multiple LED elements are included, the light irradiated from the light source unit 30 may be indicated as multiple line-shaped beams through the optical member 100.

The support member 410 may be a housing having curvature or one surface of a wall or device inside or outside a building having a bent portion. The support member 410 can have a hollow cylindrical shape having a predetermined diameter 2R.

The support member 410 may be implemented using devices or apparatuses without being specially limited thereto. The devices or apparatuses can enable the optical member 100 on a sheet to be disposed at a position in which light of the light source units 30 is irradiated to one side. The support member 410 may be implemented using hats, clothes, shoes, bags, accessories, indoor and outdoor decoration components and the like.

According to an embodiment, line illumination or surface illumination in various designs may be implemented by attaching the optical member to an applied product, a device or a building having a flexure portion or curvature.

FIG. 18 is a plan view for a lighting device according to yet another embodiment of the present invention.

Referring to FIG. 18, in an embodiment, a lighting device 500 can include an optical member 100, multiple light sources 30a to 30g, and an outer lens 510.

The optical member can include a plurality of unit patterns arranged in respective independent directions in multiple areas 12a, 12f, 12g and the like of the base substrate. The optical member 100 can be substantially identical to the optical members previously described with reference to FIGS. 1 to 11 except for the fact that the optical member 100 can have flexibility so as to be disposed on one surface (an inner side and the like) of the outer lens 510 having a curvature while having the substantially same curvature as that of the outer lens, and accordingly, the detailed description thereon will be omitted in order to avoid overlapping description.

The multiple light sources 30a to 30g can be disposed at an edge part of the outer lens 510 so as to irradiate light to one side of each of the unit patterns provided in multiple areas of the optical member 100. The respective light sources can be LED light sources including one or two or more LED elements. Also, in a case where the lighting device 500 is used for vehicle lighting (e.g., car lighting or bus lighting), at least one of the light sources 30a to 30g may be operated by receiving a power supply supplied from a vehicle battery 530 (e.g., a car battery or a bus battery).

With regard to the light source unit, the first light source and the second light source may irradiate light in the same direction or in directions which cross each other from directions opposed to each other. Also, the first light source and second light source may be disposed so as to irradiate light in directions opposed to each other or in an opposite direction having an angle of 90° or more and 180° or less between the first light source and the second light source.

The outer lens 510 can refer to a cover or a lens disposed on an outer surface of a lighting device such as a lighting device for a vehicle (e.g., a car or a bus), an outdoor lighting device and the like. In a case where the outer lens is used in a vehicle (e.g., a car or a bus), the outer lens 510 may be provided so that one surface on which the optical member is disposed has a curvature leading to a curved surface of a vehicle body. That is, the outer lens 510 may be mounted to a vehicle body required to have a curvature. The outer lens 510 may be made of a transparent material, for example, a transparent plastic material such as engineering plastic and the like, though embodiments are not limited thereto.

According to an embodiment, light irradiated from the light sources can be irradiated in directions (y1 to y7) from an edge of the outer lens 510 toward a central part, and the light can be implemented as line-shaped beams or line-shaped beams with a 3D effect by the unit patterns provided in multiple areas of the optical member 100.

Also, referring again to FIG. 9, the lighting device can be capable of implementing multiple line shaped beams with a 3D effect which move along the respective pattern extension directions of the unit patterns in the respective areas according to movement of a reference point or an observing point. The lighting device 500 may be used as a lighting device for vehicles such as a headlight, a backlight, indoor illumination for vehicles, a fog lamp, a door scuff and the like. Also, the lighting device may be provided as a light device for vehicles which is advantageous in terms of a volume, thickness, weight, price, life span, stability, degree of freedom in design, and convenience in installation.

Though vehicles have been described as an application for a lighting device according to the subject invention, embodiments are not limited thereto. The lighting device may be applied to, for example, a curve portion or a flexure portion inside or outside an object to be installed with illumination such as a building, equipment, furniture and the like as a flexible lighting device in a film form. In this case, the outer lens 510 may be the support member or housing in a lens-like shape which supports the optical member or the light source.

As set forth above, according to the embodiments of the present invention, optical images having desired shapes can be implemented by controlling an optical path, optical width and light intensity through a pattern design.

According to the embodiments of the present invention, optical images having various designs can be implemented through a pattern design in various illumination fields such as general illumination, design illumination, vehicle illumination and the like by utilizing the advantageous optical member of the subject invention.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A lighting device, comprising:
a substrate;
an optical member disposed on the substrate; and
a light source unit disposed on the substrate and embedded in the optical member,
wherein the light source unit comprises a plurality of first light source units disposed on a first side of the substrate and a plurality of second light source units disposed on a second side of the substrate, the first side being opposite from the second side in a first direction,
wherein the plurality of first light source units are disposed in a first row extending in a second direction perpendicular to the first direction,
wherein the plurality of second light source units are disposed in a second row extending in the second direction,
wherein the plurality of first light source units and the plurality of second light source units are not overlapped in the second direction,
wherein each of the plurality of first light source units emits a first line-shaped beam toward an area between members of the plurality of the second light source units and each of the plurality of second light source units emits a second line-shaped beam toward an area between members of the plurality of first light source units,
wherein the optical member comprises a plurality of unit patterns arranged in pattern extension directions that respectively correspond to directions in which the first line-shaped beams and the second line-shaped beams are emitted,
wherein the plurality of unit patterns is configured such that all of the first line-shaped beams disappear in a central area of the optical member before reaching the second side of the substrate and all of the second line-shaped beams disappear in the central area of the optical member before reaching the first side of the substrate,
wherein each unit pattern of the plurality of unit patterns includes an inclined surface, wherein the plurality of unit patterns includes a first unit pattern and a second unit pattern arranged along a direction of the first line-shaped beam emitted by a first light source unit of the plurality of first light source units, and
wherein a first distance between the inclined surface of the first unit pattern and a first dummy light source of said first light source unit resulting from the inclined surface of the first unit pattern is shorter than a second distance between the inclined surface of the second unit pattern and a second dummy light source of said first light source unit resulting from the inclined surface of the second unit pattern.

2. The lighting device of claim 1, wherein a brightness of a first point of the first line-shaped beam is greater than a brightness of a second point of the first line-shaped beam, wherein the first point is an edge area of the optical member in the first direction and the second point is a middle area of the optical member in the first direction.

3. The lighting device of claim 1, wherein the each of the plurality of first light source units includes a first light source and a second light source, and wherein the first light source irradiates light in the same direction as the second light source or in a direction which intersects the direction towards which the second light source irradiates light.

4. The lighting device of claim 1, wherein a thickness of the light source unit is larger than a thickness of the optical member.

5. The lighting device of claim 1, wherein a thickness of the light source unit is smaller than a thickness of the optical member.

6. The lighting device of claim 1, comprising a lighting plate on which the optical member and the light source are disposed.

7. The lighting device of claim 1, wherein the optical member comprises:
a base substrate; and
the plurality of unit patterns sequentially arranged on a first surface of the base substrate and having the inclined surface with an inclination angle with respect to the first surface,
wherein each of the plurality of unit patterns is extended in the second direction and the first direction.

8. The lighting device of claim 1, wherein the optical member comprises:
a base substrate; and
a pattern layer disposed on the base substrate,
wherein the pattern layer includes a first surface facing toward the base substrate and a second surface including the plurality of unit patterns,
wherein the plurality of unit patterns are sequentially arranged on the second surface of the pattern layer and each has the inclined surface with an inclination angle with respect to the second surface,
wherein each unit pattern is continuously extended in the second direction.

9. The lighting device of claim 1, wherein the plurality of first light source units comprises at least three first light source units,
wherein the plurality of second light source units comprises at least three second light source units,
wherein at least one of the first light source units of the plurality of first light source units emits the first line-shaped beam in the first direction, and
wherein at least one of the second light source units of the plurality of second light source units emits the first line-shaped beam in the first direction.

10. The optical member of claim 7, wherein an optical width of the first line-shaped beam is less than a width of a light emitting surface of each first light source unit, and
wherein an optical width of the second line-shaped beam is less than a width of a light emitting surface of each second light source unit.

11. The lighting device of claim 7, wherein the light source unit includes LED (Light Emitting Diode) elements as light sources and irradiates light to a hemisphere area on the basis of the light sources, and the optical member implements the line shaped beam within the hemisphere area.

12. The lighting device of claim 8,
wherein the plurality of unit patterns are formed of the same material as the first surface of the pattern layer and are formed of a different material from the base substrate,
wherein a refractive index of the base substrate is smaller than a refractive index of the pattern layer.

13. The lighting device of claim 8, wherein a refractive index of the base substrate is in a range of from 1.3 to 1.8 and wherein the inclination angle of each inclined surface is in a range of from 33.7° to 50.3°, or wherein a refractive index of the base substrate is in a range of from 1.3 to 1.8 and wherein the inclination angle of each inclined surface is in a range of from 49.7° to 56.3°.

14. The lighting device of claim 8, wherein a cross section of each inclined surface has a straight-line shape, a rounded shape, a shape having a plurality of straight-line segments connected to form an overall curved shape, or any combination thereof.

15. The lighting device of claim 8, wherein a distance between two adjacent unit patterns among the unit patterns ranges from 10 to 500 µm.

16. The lighting device of claim 8, wherein each of the plurality of unit patterns has two inclined surfaces, each inclined surface having an inclination angle with respect to the unit pattern inclination angle direction, and
wherein a cross-sectional view of each unit pattern has a triangular shape, with the first surface of the base and the two inclined surfaces being the three sides of the triangle.

17. The lighting device of claim 8, wherein the base substrate is a transparent substrate having a haze of 2% or less in a plate or film form.

18. The lighting device of claim 8, wherein a thickness of the base substrate is in a range of from 25 µm to 10 mm, and
wherein the pattern layer comprises a photocurable resin.

19. The lighting device of claim 12, including an adhesive layer between the base substrate and the pattern layer, wherein a refractive index of the adhesive layer is larger than the refractive index of the base substrate and the pattern layer.

20. The lighting device of claim 16, wherein in the cross-sectional view of each unit pattern, the inclined surfaces have different lengths.

* * * * *